(12) United States Patent
Diels

(10) Patent No.: US 11,454,337 B2
(45) Date of Patent: Sep. 27, 2022

(54) LOW-WEIGHT PROFILES AND HOSES HAVING HIGH FLEXURAL FATIGUE

(71) Applicant: Plastiflex Group, Beringen (BE)

(72) Inventor: Domin Diels, Gierle (BE)

(73) Assignee: Plastiflex Group, Beringen (BE)

( * ) Notice: Subject to any disclaimer, the term of this patent is extended or adjusted under 35 U.S.C. 154(b) by 45 days.

(21) Appl. No.: 16/967,154

(22) PCT Filed: Feb. 11, 2019

(86) PCT No.: PCT/EP2019/053310
§ 371 (c)(1),
(2) Date: Aug. 4, 2020

(87) PCT Pub. No.: WO2019/155058
PCT Pub. Date: Aug. 15, 2019

(65) Prior Publication Data
US 2021/0054951 A1   Feb. 25, 2021

(30) Foreign Application Priority Data
Feb. 9, 2018 (EP) .................... 18156007

(51) Int. Cl.
*F16L 11/04* (2006.01)
*F16L 11/16* (2006.01)

(52) U.S. Cl.
CPC ............... *F16L 11/04* (2013.01); *F16L 11/16* (2013.01)

(58) Field of Classification Search
CPC .................................. F16L 11/04; F16L 11/16

USPC .................................................. 138/129, 154
See application file for complete search history.

(56) References Cited

U.S. PATENT DOCUMENTS

| | | | | |
|---|---|---|---|---|
| 5,443,100 | A * | 8/1995 | Finley | F16L 11/15 138/122 |
| 9,429,256 | B2 * | 8/2016 | Baccaro | B32B 27/306 |
| 10,639,872 | B2 * | 5/2020 | Sato | B32B 27/34 |
| 2003/0178082 | A1 * | 9/2003 | Yamaguchi | B32B 1/08 138/129 |
| 2011/0240333 | A1 * | 10/2011 | Junqvist | C08L 23/04 174/110 SR |

(Continued)

FOREIGN PATENT DOCUMENTS

| EP | 2182525 A1 | 5/2010 |
|---|---|---|
| EP | 2918635 A1 | 9/2015 |

(Continued)

*Primary Examiner* — Craig M Schneider
*Assistant Examiner* — David R Deal
(74) *Attorney, Agent, or Firm* — N.V. Nederlandsch Octrooibureau

(57) ABSTRACT

The invention relates to a profile made from a polymer material comprising a linear low-density polyethylene and a very low-density polyethylene having a specific range of flexural modulus, and to a flexible hose made from said profile. It is part of the invention that the profile wall thickness of the flexible hose is reduced while a sufficient and efficacious value for the flex life is maintained and while a sufficiently high memory is maintained, when compared to the common wall thickness of current hoses, such that the hose of the invention has a reduced weight while the durability and fatigue resistance of the hose is maintained at a sufficiently high value.

20 Claims, 6 Drawing Sheets

(56) References Cited

U.S. PATENT DOCUMENTS

| | | | |
|---|---|---|---|
| 2013/0048131 A1* | 2/2013 | Smillie | B32B 27/306 138/97 |
| 2013/0190714 A1* | 7/2013 | Bourgeois | B32B 1/08 604/500 |
| 2013/0190723 A1* | 7/2013 | Bourgeois | A61L 29/041 604/507 |
| 2014/0283940 A1* | 9/2014 | Bourgeois | B32B 27/08 138/137 |
| 2015/0068635 A1* | 3/2015 | Strunk | F16L 11/08 138/121 |
| 2015/0016677 A1 | 6/2015 | Young et al. | |
| 2016/0185942 A1* | 6/2016 | Quinebeche | C08L 23/06 428/375 |
| 2017/0130876 A1* | 5/2017 | Gopalan | B32B 5/026 |

FOREIGN PATENT DOCUMENTS

| | | |
|---|---|---|
| WO | 2006/101999 A1 | 9/2006 |
| WO | 2006/101999 A2 | 9/2006 |
| WO | 2006/101999 A3 | 9/2006 |

* cited by examiner

LOW-WEIGHT PROFILES AND HOSES HAVING HIGH FLEXURAL FATIGUE

TECHNICAL FIELD OF THE INVENTION

The invention relates to a profile made from a polymer material comprising a linear low-density polyethylene and a very low-density polyethylene having a specific range of flexural modulus, and to a flexible hose made from said profile. It is part of the invention that the profile wall thickness of the flexible hose is reduced while a sufficient and efficacious value for the flex life is maintained and while a sufficiently high memory is maintained, when compared to the common wall thickness of current hoses, such that the hose of the invention has a reduced weight while the durability and fatigue resistance of the hose is maintained at a sufficiently high value.

BACKGROUND OF THE INVENTION

Spirally wound flexible hoses for applications such as household applications, cleaning of a swimming pool, industrial applications, and central vacuum systems, etc., are well known in the art. Materials used for such flexible hoses are mostly materials consisting of a single type of polymer or polymer compositions, referred to as "blends". Such blends commonly comprise a combination of several types of polyethylene (PE) such as ethylene-vinyl acetate (EVA), ethylene butyl acrylate copolymer (EBA), ethylene ethyl acrylate copolymer (EEA), ethylene methacrylate copolymer (EMA), linear low-density polyethylene (LLDPE), very low-density polyethylene (VLDPE), VLDPE-polyolefin elastomer (VLDPE-POE), and thermoplastic elastomers (TPE). The percentage of a PE applied in a blend is selected based on the overall composition of the blend material and on the aimed profile to be made of said blend, wherein the produced profile is for example subsequently used for producing a flexible hose. The percentage of a PE in a blend is selected such that the hose is provided with a predetermined and desired value for e.g. the flexibility of a hose made from the blend, the extent of contraction of the polymer composition, the elongation behavior of the polymer composition, the airstream resistance of the hose, the memory of the polymer composition, the collapsing of the polymer composition and the flex life of the polymer material.

In general, the flexural modulus, or bending modulus, of a blend consisting of polymers is calculated as the sum of the separate flexural moduli of each of the polymer materials in the blend multiplied by the fraction of each of said polymer materials in the blend. When flexible hoses now commonly used for vacuum cleaners are considered, the flexural modulus of the blend comprising various different PE's is typically between 100 MPa and 180 MPa, such that the memory of the hose material is at least 90%, preferably at least 94%. In order to be able to provide a flexible hose with such a flexural modulus, typically the wall thickness of a now routinely applied hose profile should be as much as between 0.5 mm and 0.7 mm. Herewith, such flexible hoses are heavy, having a weight per meter hose of between about 160 grams and 170 grams per meter, for a hose having an inside diameter of 32 mm. For example, a typical flexible hose currently available is a hose with a flexural modulus of about 150 MPa, a wall thickness of about 0.7 mm and a weight of about 170 g/m.

Flexible hoses applied for pool cleaning systems are commonly slightly stiffer than flexible hoses applied for vacuum cleaners. That is to say, the flexural modulus of a pool hose is typically between 140 MPa and 200 MPa, whereas the wall thickness of such a pool hose is similarly large compared to the typical wall thickness of a hose for vacuum cleaners, i.e. between about 0.5 mm and 0.7 mm. Pool hoses typically have a larger inner diameter than hoses for vacuum cleaners. A commonly applied diameter for a pool hose is 38 mm. The hose weight per meter for a flexible pool hose having an inner diameter of 38 mm is typically between about 205 g/m and 270 g/m. Such high hose weight per meter hose depends not only on the stiffness of the polymer blend used for making the hose, but also on the specific shape of the profile of which the flexible hose is wound. The actual hose weight per meter hose is further also determined by requirements of the customer regarding desired flexibility, flex life and memory of the pool hose. Manufacturing the hoses with such hose weights consumes relatively high amounts of valuable polymer resources.

However, current flexible hoses having the desired specifications and made of blends comprising a PE have several drawbacks. First, such hoses are relatively heavy, i.e. typically over 160 g/m (hose diameter is 32 mm). Second, producing such flexible hoses with relatively thick wall thickness, i.e. over 0.5 mm, demands a high amount of (costly) blend raw material. Thirdly, and related to the high raw material consumption for producing current hoses, costs for hose production are an issue which puts the commercial success of hose manufacturers under pressure to a certain extent.

Therefore, hose manufacturers are continuously in high need for improvements in manufacturing of hoses, such that desired high-quality specifications such as memory and flex-life, and preferably resistance against a vacuum of e.g. 400 millibar at the inside of the hose without forming a kink while bended, are maintained while hose production costs can be reduced and polymer material can be saved.

SUMMARY OF THE INVENTION

It is a first goal of the present invention to take away the above mentioned disadvantages, or at least to provide a useful alternative to the state of the art.

It is an objective of the current invention to provide a polymer material and a profile for, for example, the manufacturing of hoses, which polymer material and profile have at least the same properties with regard to for example flex life, as current polymer materials and profiles, though which enables production of hoses consuming less polymer material per meter hose.

At least one of the above objectives is achieved by providing a polymer material or polymer blend comprising at least one polyethylene, preferably two polyethylenes, such that hoses made therefrom have sufficient flex life and memory compared to hoses now made of current polymer materials, to name a few beneficial properties of the polymer material or polymer blend of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The embodiments of the invention described herein can operate in combination and cooperation, unless specified otherwise.

Furthermore, the various embodiments, although referred to as "preferred" or "e.g." or "for example" or "in particular" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

A first aspect of the invention is a polymer material comprising a first polyethylene, wherein the flexural modulus of said first polyethylene is between 5 MPa and 500 MPa such that the flexural modulus of the polymer material is between 30 MPa and 300 MPa.

In one embodiment, in the polymer material according to the invention, the first polyethylene is the sole polymer in the polymer material, and the flexural modulus of said first polyethylene is between 30 MPa and 300 MPa, preferably between 100 MPa and 250 MPa, more preferably between 120 MPa and 250 MPa.

It is part of the invention that in the polymer material according to the invention, the first polyethylene is a linear low-density polyethylene or is a very low-density polyethylene.

Preferred is the polymer material according to the invention, wherein the polymer material further comprises a second polyethylene, the flexural modulus of said second polyethylene being between 5 MPa and 500 MPa.

In one embodiment, the polymer material according to the invention comprises a first polyethylene and a second polyethylene, wherein said first polyethylene is a very low-density polyethylene and said second polyethylene is a linear low-density polyethylene.

Preferred is the polymer material according to the invention, wherein the first polyethylene and the second polyethylene are the sole polymers in the polymer material.

Notably, the first PE and/or the second PE comprised by the polymer material of the invention is in some embodiments from a source of recycled VLDPE and/or recycled LLDPE, and/or from a batch of PE which is offspec according to quality control measures applied by the manufacturer of the PE, according to the invention. The inventors now found that using such recycled PE and/or offspec PE for manufacturing the polymer material of the invention provided a material that is surprisingly suitable for manufacturing profiles and hoses therefrom, with regard to the achieved flex life, flexural modulus, melt index, etc., without any drawbacks caused and/or limitations encountered by application of such perhaps otherwise inferior PE material in the manufacturing of polymer materials and blends.

In some embodiments, for the polymer material according to the invention, the flexural modulus of the first polyethylene is between 5 MPa and 200 MPa, preferably between 5 MPa and 140 MPa, and the flexural modulus of the second polyethylene is between 100 MPa and 500 MPa, preferably between 130 MPa and 350 MPa.

In one embodiment, the polymer material according to the invention has a flexural modulus of between 30 MPa and 300 MPa, such as between 80 MPa and 300 MPa, preferably between 100 MPa and 250 MPa, more preferably between 120 MPa and 230 MPa.

For the polymer material according to the invention, comprising the first and second polyethylene, it is preferred that the weight ratio between said first polyethylene and said second polyethylene is between 1:100 and 100:1 in the polymer material, preferably between 1:10 and 10:1, more preferably between 1:3 and 3:1, most preferably between 1:2 and 2:1. Typically, the weight ratio between said first polyethylene and said second polyethylene is between 40:60 and 60:40, such as 50:50, although alternative ratios are equally suitable according to the invention. Typically, the first polyethylene is a very low-density polyethylene and the second polyethylene is a linear low-density polyethylene. Typically, the first and second polyethylene are the sole polymers in the polymer material of the invention, typically, said first and second polyethylene are very low-density polyethylene and linear low-density polyethylene, according to the invention.

According to the invention, the polymer material of the invention has a melt index of at least 0.25 g/10 min, preferably between 0.25 g/10 min and 20 g/10 min, such as between 1.2 g/10 min and 20 g/10 min, preferably between 1.5 g/10 min and 10 g/10 min, more preferably between 1.8 g/10 min and 5.0 g/10 min, even more preferably between 2.0 g/10 min and 4.0 g/10 min.

In another very preferred embodiment, the polymer material in the profile for a flexible hose according to the invention has a melt index of between 0.3 g/10 min and 2 g/10 min, still more preferably between 0.7 g/10 min and 2 g/10 min. In yet another very preferred embodiment, the polymer material in the profile for a flexible hose according to the invention comprises a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, and wherein the polymer material has a melt index of between 0.3 g/10 min and 2 g/10 min, more preferably between 0.7 g/10 min and 2 g/10 min.

Melt index of the polymer material is established following a standardized method as laid down in the standards ASTM D1238 and ISO 1133. Melt index of the polymer material as described herein is determined in accordance with ASTM D1238-13. The polymer material of the invention comprising a first polyethylene and optionally comprising a second polyethylene, preferably the first and second polyethylene are the sole polymers in the polymer material, provides for a material with a melt index of above 1.0 g/10 min, according to the invention, typically 2.0 g/10 min or higher, such as between 2.0 g/10 min and 3.0 g/10 min. Alternatively, the polymer material of the invention comprising a first polyethylene and optionally comprising a second polyethylene, preferably the first and second polyethylene are the sole polymers in the polymer material, provides for a material with a melt index of above 1.0 g/10 min, according to the invention, typically 2.0 g/10 min or higher, such as between 2.0 g/10 min and 3.0 g/10 min. According to the current common general knowledge of one having ordinary skill in the art, as a rule of thumb, an article such as a hose made of the first polymer material with a higher melt index than a second polymer material, has a lower flex life than the flex life of a similar hose made of said second polymer material. Surprisingly, the inventors now found that the polymer material of the invention with a melt index of above 1.5 g/10 min, such as above 1.8 g/10 min, in particular 2.0 g/10 min or higher, when applied for the manufacturing of a hose, the flex-life of said hose is higher than the flex-life of a similar hose manufactured from a polymer material which as a melt index of below 2.0 g/10 min, typically about 1.0 g/10 min.

According to another embodiment of the invention, the polymer material of the invention has a melt index of lower than 1.2 g/10 min, preferably between 0.2 g/10 min and 1.2 g/10 min, more preferably between 0.3 g/10 min and 1.0 g/10 min, most preferably between 0.4 g/10 min and 0.8 g/10 min, such as about 0.25 g/10 min or 0.9 g/10 min or 1.1 g/10 min. As said before, melt index of the polymer material is established following a standardized method as laid down in the standards ASTM D1238-13. The polymer material of the invention comprising a first polyethylene and optionally comprising a second polyethylene, preferably the first and second polyethylene are the sole polymers in the polymer material, provides for a material with a melt index of lower than 1.0 g/10 min, according to the invention, typically lower than 0.9 g/10 min or higher, such as between 0.2 g/10 min and 1.0 g/10 min. An article such as a hose or a profile, manufactured from a polymer material which has a melt index of about 1.0 g/10 min or lower, commonly has a relatively rough surface, hampering the applicability of such a profile for the manufacturing of e.g. a hose. Currently, a solution to said problem related to application of a polymer material having a melt index of about 1.0 g/10 min or lower in the manufacturing of a profile having a rough surface, is the co-extrusion of a further polymer material for covering and smoothening the rough profile surface. Such co-extrusion is applicable for the purpose of applying the polymer material of the invention for manufacturing for example a profile, and a hose made thereof, according to the invention, wherein the melt index of the polymer or the polymer blend of the invention is lower than 1.0 g/10 min, such as about 0.25 g/10 min, or about 0.5 g/10 min or about 0.7 g/10 min.

Typically, the density of the polymer material of the invention is between 0.88 g/cm$^3$ and 0.96 g/cm$^3$, preferably between 0.89 g/cm$^3$ and 0.94 g/cm$^3$ more preferably between 0.90 g/cm$^3$ and 0.92 g/cm$^3$, such as about 0.905 g/cm$^3$ or about 0.916 g/cm$^3$, according to the invention. Typically, the density of the linear low-density polyethylene is between 0.915 g/cm$^3$ and 0.925 g/cm$^3$, and the density of the very low-density polyethylene is typically between 0.88 g/cm$^3$ and 0.915 cm$^3$, such as for example about 0.900 g/cm$^3$.

In one embodiment, the polymer material of the invention comprises a single polyethylene, the flexural modulus of said polyethylene being between 180 MPa and 250 MPa, wherein the density of said polymer material is between 0.905 g/cm$^3$ and 0.925 g/cm$^3$, preferably between 0.905 g/cm$^3$ and 0.916 g/cm$^3$. Typically, the first polyethylene is a very low-density polyethylene and the second polyethylene is a linear low-density polyethylene.

A second aspect of the invention is a method for producing a polymer material, comprising the steps of:
   (a) providing granules of a polymer mixture, which mixture comprises a first polyethylene according to the invention and optionally a second polyethylene according to the invention;
   (b) introducing the granules of step (a) into a blender;
   (c) mixing the granules in the blender at ambient temperature; and
   (d) heating the mixed granules of step (c) to between 170° C. and 250° C. while mixing, such that the polymer material is formed,
wherein the flexural modulus of said polymer material is between 80 MPa and 300 MPa.

It will be understood that if in the method of the invention in step (a) a second polyethylene is applied, the polymer material formed in step (d) of the method is a polymer blend material comprising the first PE and the second PE of step (a).

A third aspect of the invention is a polymer material obtainable by the method of the invention.

A fourth aspect of the invention is a profile comprising the polymer material according to the invention or comprising the polymer material obtainable by the method of the invention.

Particularly preferred is a profile for a flexible hose, comprising a polymer material comprising a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa.

Particularly preferred is a profile according to the invention, wherein the profile has a substantially uniform wall thickness d or has a non-uniform wall thickness d of between 0.1 mm and 2.5 mm, preferably between 0.2 mm and 1.0 mm, more preferably d is between 0.3 mm and 0.8 mm, most preferably between 0.3 mm and 0.7 mm.

A fifth aspect of the invention is a flexible hose comprising the polymer material of the invention or comprising the polymer material obtainable by the method of the invention.

Preferred is the flexible hose of the invention, wherein the flexible hose comprises the profile according to the invention.

In one embodiment, the flexible hose according to the invention has an inner diameter of between about 0.6 cm and 10.0 cm, preferably between about 2.5 cm and 5.0 cm, more preferably between about 3.0 cm and 4.0 cm.

In one embodiment, the flexible hose according to the invention has a weight of less than 220 g/m, preferably between 210 g/m and 110 g/m, more preferably between 200 g/m and 120 g/m, most preferably between 160 g/m and 120 g/m, and wherein the inner diameter of the flexible hose is between 25 mm and 50 mm, preferably between 30 mm and 42 mm, more preferably between 32 mm and 38 mm. In an embodiment, the flexible hose according to the invention has a weight of between 160 g/m and 120 g/m and the inner diameter of said flexible hose is 32 mm or the weight of said flexible hose is between 210 g/m and 160 g/m and the inner diameter of said flexible hose is 38 mm.

Particularly preferred is the flexible hose according to the invention, wherein the memory of said flexible hose is at least 85%, preferably between 88% and 100%, more preferably between 92% and 99,5%, most preferably between 94% and 99%, such as between 88% and 98%.

A flexible hose, wherein said flexible hose resists vacuum of 400 millibar at the inside of the flexible hose without forming a kink while bended is also part of the invention.

In one embodiment, the flexible hose according to the invention is a hose with a flex life of at least 10.000 cycles, such as at least 40.000 cycles, preferably between 40.000 cycles and 1.000.000 cycles, more preferably between 100.000 cycles and 250.000 cycles, according to the standardized repeated bending test (IEC 60312-1, Edition 1.0 (2010), N° 6.9 (2.5 kg)).

A preferred flexible hose of the invention is a spirally wound hose with an inner diameter of between 31 mm and 39 mm, such as about 38 mm, and wherein the weight of the hose is between 120 g/m and 220 g/m, the memory is between about 90% and 98%, preferably between about 93% and 98%, the hose resists vacuum of 400 millibar at the inside of the hose without forming a kink while bended, the flex life of the hose is at least 40.000 cycles, preferably between 100.000 cycles and 500.000 cycles, according to the standardized repeated bending test (IEC 60312-1, Edition 1.0 (2010), N° 6.9 (2.5 kg)), and the flexural modulus of the polymer material of which the hose is produced is 300 MPa or less, preferably between 80 MPa and 250 MPa, more preferably between 120 MPa and 230 MPa, and the melt index of said polymer material is between 1.2 g/10 min and 5 g/10 min, preferably between 1.8 g/10 min and 3 g/10 min.

Another preferred flexible hose, preferably a spirally wound hose, of the invention comprises a profile comprising a polymer material comprising a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, said flexible hose having an inner diameter of between 31 mm and 39 mm, such as about 32, 33,7, 34 or 36.5 mm, wherein the weight of the hose is between 80 g/m and 220 g/m, the memory is between about 90% and 98%, preferably between about 93% and 98%, the hose resists vacuum of 400 millibar at the inside of the hose without forming a kink while bended, the flex life of the hose is at least 40.000 cycles, more preferably at least 100.000 cycles, according to the standardized repeated bending test (IEC 60312-1, Edition 1.0 (2010), N° 6.9 (2.5 kg)), and the melt index of said polymer material is between 0.3 g/10 min and 2 g/10 min, more preferably between 0.7 g/10 min and 2 g/10 min.

A sixth aspect of the invention is a vacuum cleaning system, a swimming pool cleaning system, a heating system such as a central heating system for households, a medical system such as a respiratory system, an apparatus, an industrial line, comprising a flexible hose of the invention.

Definitions

The term "blend" has its regular scientific meaning throughout the text, and here it refers to a polymer blend, or polymer mixture, being a material in which at least two polymers are blended together to create a new material with different physical properties. Blends can be divided in three categories: an immiscible polymer blend, i.e. a heterogeneous blend, a compatible polymer blend, a miscible polymer blend, which is a homogeneous polymer blend having a single-phase structure. Alternatively, blends are divided in five main types of polymer blend: thermoplastic-thermoplastic blends; thermoplastic-rubber blends; thermoplastic-thermosetting blends; rubber-thermosetting blends; and polymer-filler blends.

The term "flexural modulus", or "bending modulus" has its regular scientific meaning throughout the text and here refers to the degree of flexibility of a material. The flexural modulus is computed as the ratio of stress to strain in flexural deformation, or as the tendency for a material to bend. It is determined from the slope of a stress-strain curve produced by a flexural test (such as the ASTM D790), and uses units of force per area (Pascal). The flexural modulus as used herein is measured in accordance with ASTM D790-17.

The term "flexural fatigue" or "flex life" or "flex-life" has its regular scientific meaning and here this physical property is expressed by the number of times a material can be bent on itself through a prescribed angle before it ruptures or loses its ability to recover. These terms are used interchangeably throughout the text. Flex life as used herein is measured in accordance with the standardized repeated bending test (IEC 60312-1, Edition 1.0 (2010), N° 6.9 (2.5 kg)).

The melt flow index (MFI) or melt flow rate (MFR) or melt index (MI) is a measure for the ease of flow of melted polymer materials, more specific thermoplastic polymers. The method for assessing the MFI of a polymer material is described in the standards ASTM D1238 and ISO 1133. In brief, an amount of about 5 grams of the polymer material is heated above its melting point or softening point and forced to flow through a capillary using a piston actuated by a specified weight (usually 2.16 kg or 5 kg). The mass of melt in grams flowing through the capillary in 10 minutes is the MFI in gram/10 min. The melt index as used herein is measured in accordance with ASTM D1238-13.

The term "memory" as used herein in the context of flexible hoses refers to the resistance against deformation of a flexible hose having an initial outer diameter d1, determined in accordance with a test wherein a load of 700 N is applied to the flexible hose between two plates of 80×80 mm for 10 seconds at a temperature of 20° C., and wherein the resistance against deformation is calculated from d2/d1*100%, wherein d2 is the outer diameter of the flexible hose 1 minute after removing the load.

The 'elongation' as used herein in the context of flexible hoses is measured by vertically attaching a flexible hose of about 60 cm length at a first end to a base, marking on the hose a length of 50 cm, attaching a load of 5 kg at the second end of the flexible hose and measuring the extension of the initial length of 50 cm under load in %, 30 second after applying the load.

The 'contraction' as used herein in the context of flexible hoses is measured by marking a length of 50 cm on a flexible hose of about 60 cm length, closing one opening of the flexible hose with a plug, applying a vacuum of 280 mbar at a temperature of 20° C. to the inside of the flexible hose via the second opening and measuring the contraction of the initial length of 50 cm under vacuum in %, 60 seconds after applying the vacuum.

DETAILED DESCRIPTION OF THE INVENTION

Figure 1A:
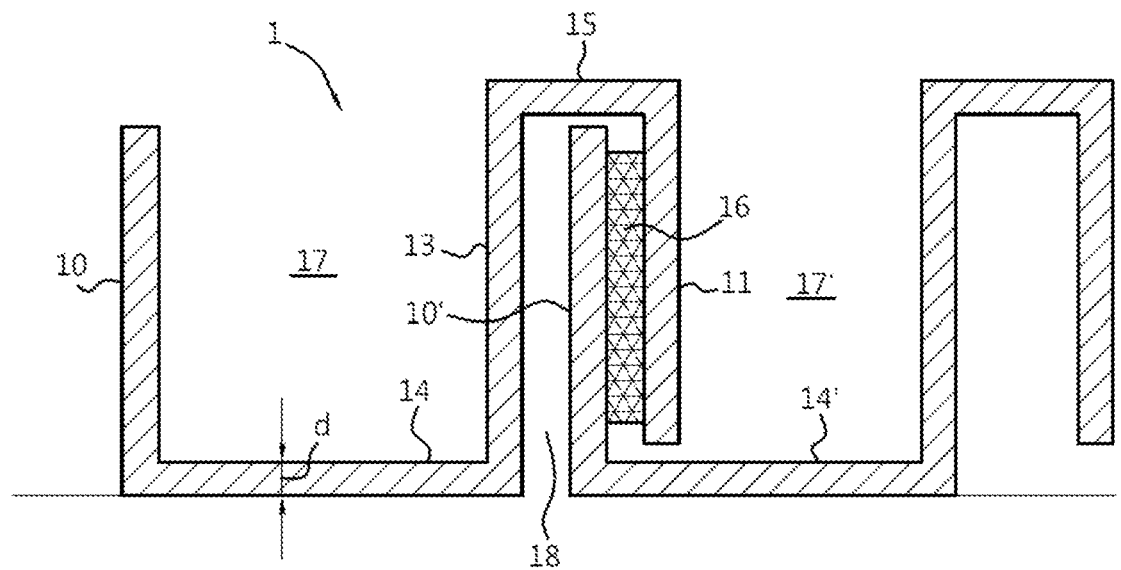
FIG. 1A displays an exemplary generally S-shaped profile of the invention made, at least in part, of a polymer material of the invention such that a spirally wound hose of the invention made with said profile has a reduced wall thickness while having desired technical specifications with regard to flex-life and memory, conserved.

A first aspect of the invention is a polymer material comprising a first polyethylene, wherein the flexural modulus of said first polyethylene is between 5 MPa and 500 MPa such that the flexural modulus of the polymer material is between 30 MPa and 300 MPa.

Surprisingly, the inventors found that profiles made from such a polymer material of the invention, and flexible hoses made therefrom, meet the quality measures established for current profiles and hoses made therefrom, though already when applying a hose wall thickness which is thinner than the hose wall thickness of current hoses applicable for the same purpose. Thus, hoses made by application of the polymer material of the invention provides the opportunity to save on the required use of polymer material, while still providing a hose that meets current quality standards. Quality standards for example relate to flex life and memory.

In one embodiment, in the polymer material according to the invention, the first polyethylene is the sole polymer in the polymer material, and the flexural modulus of said first polyethylene is between 30 MPa and 300 MPa, preferably between 100 MPa and 250 MPa, more preferably between 120 MPa and 250 MPa. It is part of the invention that the polymer material of the invention may comprise one or more further polymers in addition to the first polyethylene, providing a polymer blend of the invention, wherein the flexural modulus of the polymer blend material of the invention is between 30 MPa and 300 MPa. Such further polymers in addition to a first polyethylene are known in the art, and are for example selected from a polypropylene, a propylene block copolymer, a high-density polyethylene, a medium-density polyethylene, a polypropylene homo polymer, a random copolymer comprising polypropylene, a thermoplastic elastomer, a polyolefin thermoplastic matrix with dispersed vulcanized ethylene propylene diene monomer rubber, a vulcanized alloy of ethylene propylene diene monomer rubber particles encapsulated in a polypropylene matrix, a styrene ethylene butylene styrene polymer and a copolymer of propylene and ethylene. The first polyethylene of the polymer material of the invention is then selected from a linear low-density polyethylene and a very low-density polyethylene. It will be understood that the weight ratio between the first polyethylene and the further polymer in the blend should be selected such that the flexural modulus of the polymer blend material is between 80 MPa and 300 MPa, according to the invention. Preferred is a polymer material wherein the first polyethylene is the sole polymer of the material.

It is part of the invention that in the polymer material according to the invention, the first polyethylene is selected from a linear low-density polyethylene and a very low-density polyethylene.

Preferred is the polymer material according to the invention, wherein the polymer material further comprises a second polyethylene, the flexural modulus of said second polyethylene being between 5 MPa and 500 MPa. As said, the flexural modulus of the polymer material is between 30 MPa and 300 MPa, such that a profile and a flexible hose are manufacturable with said polymer material of the invention, the flexible hose having the advantageous characteristics known for flexible hoses made from currently existing polymer blend for manufacturing hoses.

In one embodiment, the polymer material according to the invention comprises a first polyethylene and a second polyethylene, wherein said first polyethylene is a very low-density polyethylene and said second polyethylene is a linear low-density polyethylene.

Preferred is the polymer material according to the invention, wherein the first polyethylene and the second polyethylene are the sole polymers in the polymer material. Of course, polymer blend materials having a flexural modulus of between 30 MPa and 300 MPa are part of the invention as well, wherein the polymer blend material further comprises a polymer selected from a polypropylene, a propylene block copolymer, a high-density polyethylene, a medium-density polyethylene, a polypropylene homo polymer, a random copolymer comprising polypropylene, a thermoplastic elastomer, a polyolefinic thermoplastic matrix with dispersed vulcanized ethylene propylene diene monomer rubber, a vulcanized alloy of ethylene propylene diene monomer rubber particles encapsulated in a polypropylene matrix, a styrene ethylene butylene styrene polymer and a copolymer of propylene and ethylene, although a polymer material comprising a very low-density polyethylene or a linear low-density polyethylene, or a combination of a very low-density polyethylene and a linear low-density polyethylene, is preferred, according to the invention. It is part of the invention that in the polymer material of the invention, the weight ratio between the first polyethylene and the one or more further polymers, or between the first and second polyethylene and the one or more further polymers is at least 3:1, preferably at least 9:1, more preferably at least 19:1, most preferably at least 49:1, such as for example about 80% first polyethylene or first and second polyethylene based on the total weight of polymers in the polymer material of the invention, or about 90%, or 95%, 97%, 98%, 99% or 99,5%, according to the invention. Preferred is a polymer material comprising 100% of a first polyethylene based on the total weight of polymers in the polymer material of the invention, or a polymer material comprising 100% of a combination of a first polyethylene and a second polyethylene based on the total weight of polymers in the polymer material of the invention. Preferably, these one or two polyethylenes are a very low-density polyethylene and a linear low-density polyethylene.

In some embodiments, for the polymer material according to the invention, the flexural modulus of the first polyethylene is between 5 MPa and 200 MPa, preferably between 5 MPa and 140 MPa, and the flexural modulus of the second polyethylene is between 100 MPa and 500 MPa, preferably between 130 MPa and 350 MPa. Of course, a polymer material comprising a polyethylene such as a very low-density polyethylene and a linear low-density polyethylene having a flexural modules below 10 MPa is also part of the invention, such as a very low-density polyethylene and a linear low-density polyethylene having a flexural modules below 5 MPa. Of course, a polymer material comprising a polyethylene such as a very low-density polyethylene and a linear low-density polyethylene having a flexural modulus above 350 MPa is also part of the invention.

In one embodiment, the polymer material according to the invention has a flexural modulus of between 30 MPa and 300 MPa, preferably between 100 MPa and 250 MPa, more preferably between 120 MPa and 230 MPa, such as between 80 MPa and 300 MPa. The inventors now found that with the polymer material of the invention, a profile for manufacturing a flexible hose can be made, such that the flexible hose made therefrom has a flexural modulus of for example between 130 MPa and 140 MPa such as about 133 MPa, or between 160 MPa and 170 MPa such as about 163 MPa, or between 180 MPa and 190 MPa such as about 184 MPa, or between 200 MPa and 210 MPa such as about 208 MPa. Such flexible hoses manufactured with a profile made from the polymer material of the invention have for example a weight per meter of between 130 g/m and 220 g/m, such as for example about 145 g/m when the internal diameter of the hose is about 33.7 mm, or about 152 g/m when the internal diameter of the hose is about 34.0 mm, or about 155 g/m when the internal diameter of the hose is about 34.7 mm, or about 170 g/m when the internal diameter of the hose is about 36.5 mm. Such flexible hoses have a memory of at least 94%, such as for example 94,5% or higher, 95,3% or 95,6%, according to the invention. For a pool hose manufactured from a polymer blend of the invention comprising an LLDPE and a VLDPE and having a flexural modulus of about 250 MPa, the memory of the hose can be 94% or less, depending on the selected type of profile. For an outline of profiles applicable for manufacturing applying the polymer material of the invention, see the description here below with reference to the Figures.

For the polymer material according to the invention, comprising the first and second polyethylene, it is preferred that the weight ratio between said first polyethylene and said second polyethylene is between 1:100 and 100:1 in the polymer material, preferably between 1:10 and 10:1, more preferably between 1:3 and 3:1, most preferably between 1:2 and 2:1. Typically, the weight ratio between said first polyethylene and said second polyethylene is between 40:60 and 60:40, such as 50:50, although alternative ratios are equally suitable according to the invention. Typically, the first polyethylene is a very low-density polyethylene and the second polyethylene is a linear low-density polyethylene. Typically, the first and second polyethylene are the sole polymers in the polymer material of the invention, typically, said first and second polyethylene are very low-density polyethylene and linear low-density polyethylene, according to the invention.

Typical further components in the polymer material of the invention are common additives in polymer compositions, blends and plastics known in the art, such as stabilizers, compatibilizers, fillers such as talcum, anti-oxidants, a carbon black, nucleating agents, clarifying agents, and pigments. In one embodiment, the polymer material of the invention comprises the filler talcum as an additive, for example between about 1 wt % and 30 wt % talcum based on the weight of the polymer material, according to the invention. Typically, the polymer material of the invention comprises further polymers such as a third, a fourth, etc., polymer, according to the invention. Of course, when the polymer material of the invention comprises one or more additives such as at least a third polymer, the flexural modulus of said third polymer is selected such that the flexural modulus of the polymer material is between about 30 MPa and 300 MPa according to the invention, such as between 80 MPa and 300 MPa. A third polymer that is typically present in a polymer material of the invention is a medium density polyethylene, for example between about 1 wt % and 50 wt % medium density polyethylene based on the weight of the polymer material. Typically, such a medium density polyethylene has a flexural modulus of between about 150 MPa and 1.000 MPa, according to the invention, such as between 250 MPa and 700 MPa, as known in the art.

Such a polymer material of the invention is surprisingly suitable for providing relatively thin-walled profiles and flexible hoses made thereof, with regard to a desired combination of advantageous technical specifications related to memory and flex-life. Advantageously and surprisingly, flexible hoses, i.e. spirally wound flexible hoses, comprising a profile made from a polymer material of the invention, have at least in part a wall thickness that is substantially thinner than currently known in the art.

Such a reduced wall thickness of the profile building up a flexible hose provides for a surprisingly significant reduction of the weight of the hose per meter of hose, and, concomitantly, in a significant reduction in the use of raw materials, i.e. a polymer material of the invention, for producing the hose. Furthermore, flex life of a flexible hose, such as a spirally wound flexible hose, is the same or increased compared to flex life of current flexible hoses having larger wall-thickness than now achievable with a flexible hose made with a profile made of a polymer material of the invention.

According to the invention, the polymer material of the invention has a melt index of between 0.25 g/10 min and 20 g/10 min or between 1.2 g/10 min and 20 g/10 min, preferably between 1.5 g/10 min and 10 g/10 min, more preferably between 1.8 g/10 min and 5.0 g/10 min, most preferably between 2.0 g/10 min and 4.0 g/10 min. Melt index of the polymer material is established following a standardized method as laid down in the standards ASTM D1238-13. The polymer material of the invention comprising a first polyethylene and optionally comprising a second polyethylene, preferably the first and second polyethylene are the sole polymers in the polymer material, provides for a material with a melt index of above 1.0 g/10 min, according to the invention, typically 2.0 g/10 min or higher, such as between 2.0 g/10 min and 3.0 g/10 min. According to the current common general knowledge of one having ordinary skill in the art, as a rule of thumb, an article such as a hose made of the first polymer material with a higher melt index than a second polymer material, has a lower flex life than the flex life of a similar hose made of said second polymer material. Surprisingly, the inventors now found that the polymer material of the invention with a melt index of 2.0 g/10 min or higher, when applied for the manufacturing of a hose, the flex-life of said hose is higher than the flex-life of a similar hose manufactured from a polymer material which as a melt index of below 2.0 g/10 min, typically about 1.0 g/10 min. A further advantage of the polymer material of the inventions is that when the polymer material is applied in the manufacturing of an article such as a sheet or a hose or a profile, the surface of for example such an extruded profile is smooth. To the contrary, a similar article such as a hose or a profile, manufactured from a polymer material which has a melt index of about 1.0 g/10 min, has a relatively rough surface, hampering the applicability of such a profile for the manufacturing of e.g. a hose. Currently, a solution to said problem related to application of a polymer material having a melt index of about 1.0 g/10 min in the manufacturing of a profile having a rough surface, is the co-extrusion of a further polymer material for covering and smoothening the rough profile surface. Such co-extrusion is made superfluous by applying the polymer material of the invention for manufacturing for example a profile, and a hose made thereof, according to the invention.

Typically, the density of the polymer material of the invention is between 0.86 g/cm$^3$ and 0.96 g/cm$^3$, preferably between 0.88 g/cm$^3$ and 0.94 g/cm3, more preferably between 0.90 g/cm$^3$ and 0.92 g/cm$^3$, such as about 0.905 g/cm$^3$, about 0.916 g/cm$^3$ or about 0.918 g/cm$^3$, according to the invention.

In one embodiment, the polymer material of the invention comprises a single polyethylene, the flexural modulus of said polyethylene being between 180 MPa and 250 MPa, wherein the density of said polymer material is between 0.905 g/cm$^3$ and 0.925 g/cm$^3$, preferably between 0.905 g/cm$^3$ and 0.916 g/cm$^3$.

In an embodiment, the polymer material according to the invention is a miscible polymer blend of the first polymer and the second polymer. That is to say, the polymer material of the invention comprises at least a first polyethylene and a second polyethylene that provide for a homogenously mixed polymer blend upon mixing said at least two polymers, according to the invention. Such mixing of polyethylenes for providing a polymer material of the invention refers to the physical mixing of polymer molecules in the polymer material, without chemical reactions between polyethylene molecules occurring at the molecular level upon mixing of the at least two polymers, according to the invention. Preferably, a first polymer and a second polymer, for example granules of said polymers, are mixed and heated to a temperature of between about 170° C. and 250° C., during extrusion, such that a polymer material of the invention is provided.

A second aspect of the invention is a method for producing a polymer material, comprising the steps of:
(a) providing granules of a polymer mixture, which mixture comprises a first polyethylene according to the invention and optionally a second polyethylene according to the invention;
(b) introducing the granules of step (a) into a blender;
(c) mixing the granules in the blender at ambient temperature; and
(d) heating the mixed granules of step (c) to between 170° C. and 250° C. while mixing, such that the polymer material is formed,
wherein the flexural modulus of said polymer material is between 80 MPa and 300 MPa.

A third aspect of the invention is a polymer material obtainable by the method of the invention.

Flexible hoses produced with profiles which are at least made in part from a polymer material of the invention having a flexural modulus of for example between about 180 MPa to 250 MPa, show particularly advantageous properties with regard to memory, flex life, temperature resistance, minimum required profile wall thickness, low density of the blend in g/cm$^3$, reduced weight of the hose in g/m, with a given hose inner diameter and hose outer diameter ('profile height'). Preferred are those polymer materials of the invention that provide for flexible hoses made of profiles produced from such polymer material of the invention, wherein such a hose has most of said advantageous properties, e.g. a high flex-life and/or a high memory, more preferably, all of such advantageous properties. It is part of the invention that flexible hoses produced with profiles which are at least made in part from a polymer material of the invention, have an optimal value for the flex life and a reduced weight per meter while the memory of the hose is maintained at an optimal value, i.e. over 85%, such as for example at least 90%, at least 94%, such as about 94%, 94,5%, 95%, 96%, 97%, 98%, 98,5%, 99% and 99,5%, preferably at least 95%.

The polymer material of the invention comprises a first polyethylene and optionally a second polyethylene which have a similar stiffness compared to polymers in blends of polymers comprising other polymers than polyethylenes now commonly applied for producing current compositions used in the manufacturing of flexible hoses. Although the stiffness of the polymer material of the invention is similar compared to compositions commonly used in the manufacturing of flexible hoses, profiles made from a polymer material of the invention and suitable for producing flexible hoses, are still beneficially adaptable with regard to the wall thickness of such profiles. That is to say, the wall thickness of a profile made from a polymer material of the invention is now surprisingly smaller than the wall thickness of about 0.6-0.7 mm for profiles made of currently known blends comprising for example a blend of polyethylene and ethylene-vinyl acetate, while such a profile made from a polymer material of the invention maintains the desired advantageous properties with regard to flex-life and memory, of profiles currently on the market. The inventors found that by selecting a polyethylene blend comprising linear low-density polyethylene (LLDPE) and very low-density polyethylene (VLDPE), with a flexural modulus of between for example 180 MPa to 250 MPa, surprisingly thin wall thicknesses are selectable for profiles made from the polymer material of the invention. That is to say, flexible hoses made by spirally winding profiles made from a polymer material of the invention have at least a surprisingly large weight reduction, e.g. a 15% to 30% lower weight expressed in gram per meter hose, when compared to hoses made of currently common polymer compositions, according to the invention. Such a reduced weight per meter of the hose is accompanied by a significant cost reduction for producing such hoses and a significant saving of materials and resources.

It is now found by the inventors that by selecting and combining an LLDPE and a VLDPE for manufacturing a polymer material of the invention, a flexible hose can be produced having a thinner wall than the wall of flexible hoses now produced from current polymer blends. For example: for a hose made of a profile manufactured from a polymer material comprising 40 wt % polyethylene (PE) based on the weight of polymer in the polymer material, with a flexural modulus of 55 MPa, and 60 wt % of a PE polymer with a flexural modulus of 270 MPa, based on the weight of the polymers, the wall thickness of the profile is as surprisingly thin as about 0.3 to 0.55 mm and the weight per meter of such a hose with an inside diameter of 32 mm is about 145 g/m or about 130 g/m, while flex life of such hose is 40.000 cycles or higher, such as 200.000 cycles or more, and memory is at least 85%, preferably at least 94%, such as 95% or higher, according to the invention. Since such a thin wall-thickness results in a decrease of the amount of polymer raw material required for manufacturing a flexible hose, cost saving and material saving is highly significant, according to the invention. Such a weight per meter of hose made from the polymer material of the invention is about 9% or about 19% lower compared with the weight per meter of about 160 gram per meter of many flexible hoses currently manufactured applying compositions lacking the well-balanced combination of a first polyethylene and a second PE, according to the invention. In polymer materials according to the invention, a first polyethylene has for example a flexural modulus of over 50 MPa, such as about 55 MPa, while the second polymer has for example a flexural modulus of less than 300 MPa, for example about 270 MPa.

By adjusting the wall thickness of the profile made of the polymer material of the invention, that is to say, by decreasing the wall thickness to values at or below 0.7 mm, e.g. between 0.3 mm and 0.55 mm, flexible hoses are provided that have at least the same or similar characteristics, and commonly improved characteristics, as flexible hoses made of currently commonly applied compositions, with regard to memory and flex life. According to the invention, reduced application of raw materials for producing a polymer material of the invention, providing the benefit of cost savings and material savings, is accompanied by the ability to provide for profiles and flexible hoses made thereof, which have at least the same technical specifications, and generally even better, with regard to flex life and memory.

In one embodiment, the polymer material according to invention, has a melt mass flow rate (190° C./2.16 kg) of between about 0.1 g/10 min and about 10 g/10 min, such as for example about 2 g/10 min. Preferred is a melt mass flow rate of at least 2 g/min and less than 3 g/10 min, such as about 1.7 g/10 min, or 2.1 g/10 min or 2.4 g/10 min.

In one embodiment, the polymer material according to invention, has a density of between about 0.85 g/cm$^3$ and 1.0 g/cm$^3$ (note: densities are related to the density of 100 crystalline PE and polypropylene), preferably between about 0.86 g/cm$^3$ and 0.930 g/cm$^3$, more preferably between about 0.88 g/cm$^3$ and 0.925 g/cm$^3$. Density of the polymer material of the invention is further lowered by applying a foaming technique known to the skilled person, when the polymer material is produced, according to the invention. With foaming, the density of the polymer material is lowered with up to about 5-15%, while the flexural modulus of the polymer material is still between 80 MPa and 300 MPa, e.g. between 180 MPa and 250 MPa, according to the invention. Thus, by applying foaming, the density of the polymer material of the invention is reduced while a desired flexural modulus is still obtainable, such that the flex life and the memory still have a value within desired boundaries, i.e. at least 40.000 cycles, such as 100.000 cycles, 200.000 cycles or more, and a memory of at least 92% such as for example 93%, 96% or 98%, respectively.

In one embodiment, the polymer material according to invention comprises a first polyethylene, e.g. VLDPE, and between about 5 wt % and 95 wt % of a second polyethylene, e.g. LLDPE, based on the weight of the first and second PE in the polymer material of the invention, preferably between 20 wt % and 80 wt % of the second PE, more preferably between 30 wt % and 70 wt %, most preferably between 40 wt % and 60 wt %, such as about 40%, about 50% or about 60%. In another embodiment, the polymer material according to invention comprises 100% of a first polyethylene, e.g. VLDPE or LLDPE, based on the weight of the polymer in the polymer material of the invention.

Preferred is a polymer material of the invention comprising as the sole polymer a PE such as VLDPE or LLDPE with a density of about 0.915 g/cm$^3$, a flexural modulus of about 230 MPa and a melt index of about 2 g/10 min.

In one embodiment, the current invention now provides for a method for producing a polymer material of the invention, comprising the steps of:
(a) providing between about 30 wt % and 90 wt % granules of a first PE and providing between about 10 wt % and 70 wt % granules of a second PE based on the weight of the first and second PE, wherein the content of the first PE and the second PE in said polymer material adds up to at least 50 wt % based on the weight of the polymer material;
(b) introducing the granules of step (a) into a blender;
(c) mixing the granules in the blender at ambient temperature; and
(d) heating the mixed granules of step (c) to between about 170° C. and 250° C. while mixing,
such that the polymer material is formed, wherein said first PE has a flexural modulus of between about 5 MPa and 300 MPa, preferably between about 10 MPa and 270 MPa and said second PE has a flexural modulus of between about 5 MPa and 300 MPa, preferably between about 10 MPa and 270 MPa, said polymer material having a flexural modulus of between about 80 MPa and 300 MPa, preferably between about 110 MPa and 230 MPa.

According to the invention, the method of the invention is in step (c) executed at ambient temperature, e.g. between about 15° C. and 25° C.

In one embodiment, in the method according to the invention, in step (a) the weight ratio between said first polyethylene and said second polyethylene ranges between 0.4:1 and 9:1 in the polymer material.

In one embodiment, in the method according to the invention, the polymer material has a flexural modulus of between about 180 MPa and 250 MPa.

In one embodiment, in the method according to the invention, the first PE has a flexural modulus of between about 40 MPa and 100 MPa and the flexural modulus of the second polymer is between about 180 MPa and 300 MPa.

The heated mixture of granules of step (d) is typically used for manufacturing a profile which is at least partly formed from the polymer material provided by the method of the invention. The profile may for example be formed by extrusion of the heated mixture in the form of the profile (possibly co-extrusion of the polymer material with another, compatible material), or by extrusion of the heated mixture in a planar form which is subsequently deformed by passing the planar form over one or more rollers. Such a profile is then typically provided with the thin wall-thickness of at most 0.68 mm, e.g. between 0.1 mm and 0.67 mm, such as about 0.66 mm, 0.64 mm, 0.62 mm, 0.60 mm, 0.58 mm, 0.56 mm, 0.54 mm, 0.52 mm, or 0.50 mm, according to the invention.

In one embodiment, the content of the first PE and optionally the second PE in the polymer material of the invention adds up to between about 60 wt % and 100 wt % based on the weight of the polymer material, preferably, between about 70 wt % and 90 wt % based on the weight of the polymer material, more preferably, about 80 wt % based on the weight of the polymer material.

In a preferred embodiment, in the method of the invention the flexural modulus of the first PE, the flexural modulus of the optional second PE, and the fraction of first PE and the fraction of optional second PE in the polymer material of the invention are selected such that the polymer material provided by the method of the invention has a flexural modulus of between about 110 MPa and 300 MPa, preferably between about 110 MPa and 240 MPa, more preferably between about 125 MPa and 215 MPa, most preferably between about 125 MPa and 215 MPa.

A fourth aspect of the current invention relates to a profile comprising the polymer material according to the invention or the polymer material obtainable by the method of the invention.

A fifth aspect of the current invention relates to a profile consisting of the polymer material according to the invention or consisting of a polymer material obtainable by the method of the invention.

Profiles of the invention made at least in part of a polymer material of the invention are suitable for the production of flexible hoses.

Particularly preferred is a profile for a flexible hose, comprising a polymer material comprising a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa.

Profiles suitable for the production of flexible hoses have one of numerous different shapes and different dimensions, related to the specific application of a profile and related to desired technical specifications aimed for by the manufacturer and the end-user of the profile. Also profiles manufactured for the production of flexible hoses such as spirally wound flexible hoses indeed can have one of many shapes applicable for the end-use. Examples of a few of such different shapes of profiles are shown in FIGS. 1-4, which profiles are typical profiles made at least in part from a polymer material of the invention. The profiles shown may thus be made entirely from the polymer material of the invention, or partly by a co-extrusion of the polymer material of the invention with another, compatible material.

Figure 1B:
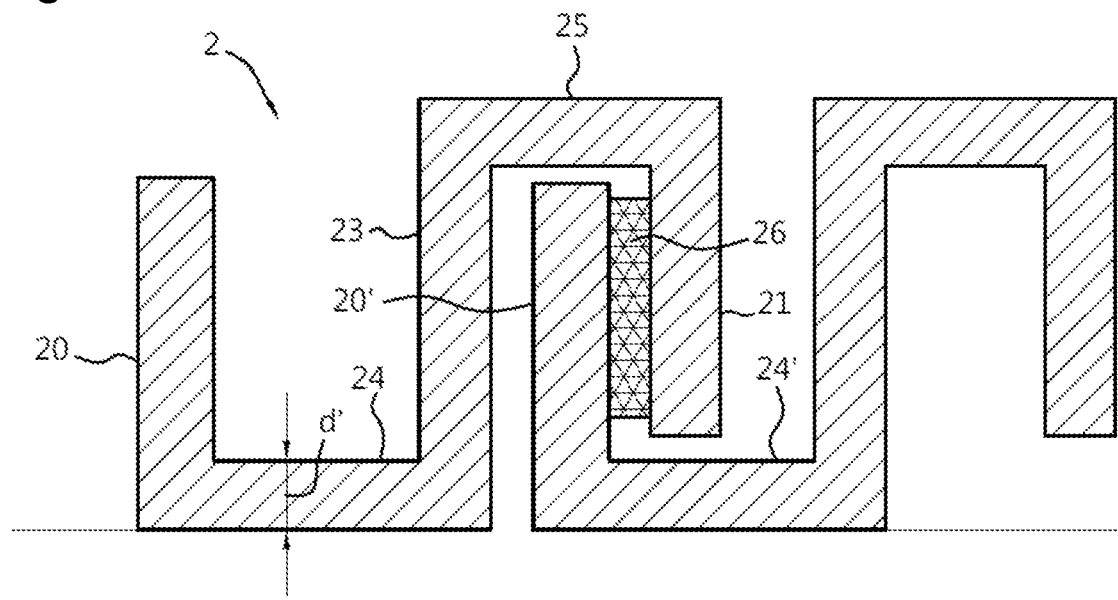
FIG. 1B displays a profile from the prior art, having a relatively large wall thickness compared to the profile of FIG. 1A, required for achieving the required technical specifications with regard to memory and flex-life, with the blends currently available.
Figure 1C:
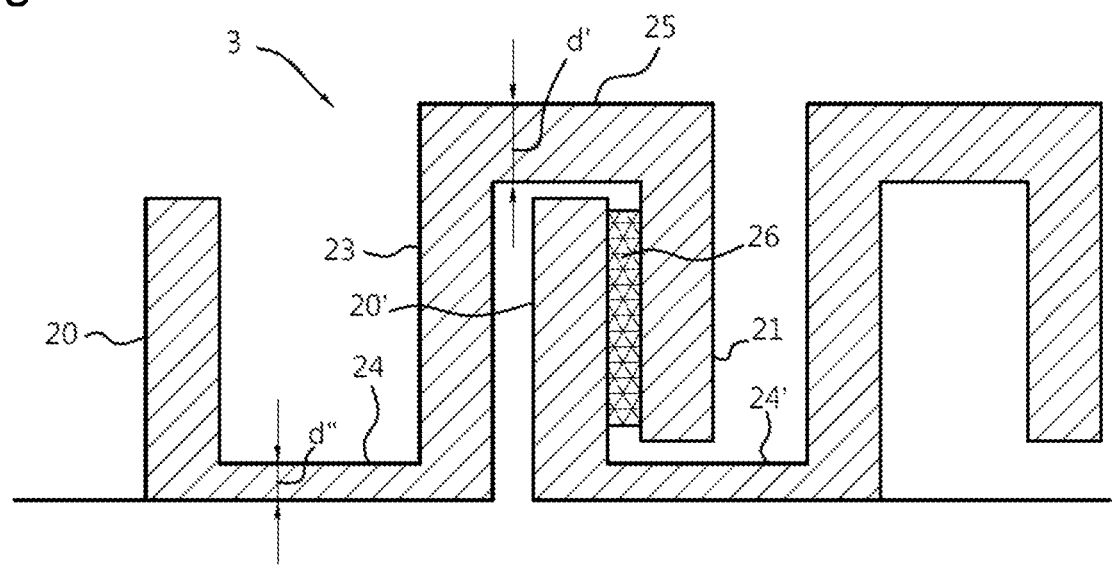
FIG. 1C displays an exemplary variant of the profile of FIG. 1A, having a non-uniform thickness.

In FIG. 1A, a generally S-shaped thin-walled profile 1 according to the invention is shown, and in FIG. 1B, a generally S-shaped thick-walled profile 2 from the prior art is shown, comprising a first upstanding part 10, 10',20, 20' forming one end of the profile, the first upstanding part 10, 20 connected to an upper laying part 15, 25, in turn connected to a second upstanding part 13, 23, in turn connected to a lower laying part 14, 14',24, 24', in turn connected to a third upstanding part 11, 21 forming the other end of the profile, such that the first and second upstanding parts together with the upper laying part form a hollow upwards corrugation 17, 17' adapted for receiving the third upstanding part 11 of a consecutive profile part. The profile in FIGS. 1A and 1B has a uniform wall thickness d, d', wherein d in FIG. 1A is smaller than d' in FIG. 1B. The profile 3 in FIG. 1C for example has a non-uniform wall thickness, with for example a wall thickness d' of for example the upper laying part 25 and the third upstanding part 21, and a smaller wall thickness d" of for example the lower laying part 24, 24'. In FIG. 1, two consecutive profile parts are displayed forming hollow upwards corrugation 17, 17'. Consecutive profile parts are welded together with a weld 16, 26.

The second upstanding part 13, 23 and the third upstanding part 11, 21, connected with an upper laying part 15, 25, form a hollow downwards corrugation 18, adapted for receiving the first upstanding part 10, 20.

Particularly preferred is a profile according to the invention, wherein the profile has a substantially uniform wall thickness d or has a non-uniform wall thickness d of between 0.1 mm and 2.5 mm, preferably between 0.3 mm and 1.0 mm, more preferably d is between 0.4 mm and 0.8 mm, most preferably between 0.5 mm and 0.7 mm. In a preferred embodiment, the profile according to the invention has a substantially uniform or a non-uniform wall thickness of between about 0.1 mm and 2.5 mm, preferably between about 0.1 mm and 0.55 mm, more preferably between about 0.2 mm and 0.5 mm. For example, the profile of the invention has a uniform wall thickness of 0.25 mm, or 0.35 mm, or 0.4 mm or 0.5 mm. For example the profile of the invention has a non-uniform wall thickness of 0.25 mm, or 0.35 mm, or 0.4 mm or 0.5 mm for a thinner part(s) of the profile and a wall thickness of at least 0.5 mm, e.g. 0.7 mm, for the thicker part(s) of the profile, according to the invention. Typically, the wall thickness of a flexible hose comprising polymer material of the invention is between 0.30 mm and 0.45 mm, such as about 0.35 mm, according to the invention.

An important achievement of the current invention is the provision of a profile of the invention which is provided with a reduced wall thickness and is provided with a smooth surface, which combination of a profile having a reduced wall thickness and a smooth surface is now possible by applying a polymer material of the invention having a relatively low density of lower than 0.916 g/cm$^3$ and having a substantially higher melt index, i.e. above 1.0 g/10 min and even as high as about 2.0 g/10 min compared to currently applied polymer blends having a melt index of smaller than 1.0 g/10 min, while the smoothness of the surface of the polymer of the invention is still the same or similar to the smoothness of the surface of current polymer blends now commonly made in the art, such that light weight hoses of the invention have become available. Such weight reduction results in significant reduction in the use of raw materials and therewith in significant cost saving for the flexible hose manufacturer. Counter intuitively, application of a polymer material with a melt index as high as now applied by the inventors, which surprisingly still provided for a smooth polymer surface, contributes to the applicability of the polymer material of the invention comprising a VLDPE as a first PE and optionally an LLDPE as a second PE.

For example, the invention now provides for a flexible smooth-surfaced hose made of a polymer material of the invention with a flexural modulus of about 133-208 MPa or about 250 MPa, said flexible hose having a wall thickness of about 0.35-0.5 mm and a weight of about 130 g/m and an inner diameter of 32 mm. For example, the invention now provides for a flexible smooth-surfaced hose made of a polymer material of the invention with a flexural modulus of about 200 MPa, said flexible smooth-surfaced hose having a wall thickness of about 0.5 mm and a weight of 145 g/m or 130 g/m and an inner diameter of 32 mm. For example, the invention now provides for a flexible smooth-surfaced hose made of a polymer material of the invention with a flexural modulus of about 133 MPa, said flexible smooth-surfaced hose having a wall thickness of about 0.57-0.64 mm, such as about 0.61 mm and a weight of about 201 g/m and an inner diameter of 34.7 mm. For example, the invention now provides for a flexible smooth-surfaced hose made of a polymer material of the invention with a flexural modulus of about 163 MPa, said flexible hose smooth-surfaced hose having a wall thickness of about 0.58 mm and a weight of about 163 g/m and an inner diameter of 34 mm. For example, the invention now provides for a flexible smooth-surfaced hose made of a polymer material of the invention with a flexural modulus of about 184 MPa, said flexible hose smooth-surfaced hose having a wall thickness of about 0.40-0.50 mm and a weight of about 150 g/m and an inner diameter of 33.7 mm. For example, the invention now provides for a flexible smooth-surfaced pool hose made of a polymer material of the invention with a flexural modulus of about 208 MPa, said flexible hose smooth-surfaced hose having a wall thickness of about 0.55-0.65 mm and a weight of about 200 g/m and an inner diameter of 36.5 mm. Typically, the flexible smooth-surfaced hoses of these exemplified embodiments of the invention comprise a polymer material of the invention comprising 40-60 wt % VLDPE and 40-60 wt % LLDPE such as 50 wt % of both VLDPE and LLDPE, based on the weight of the total amount of polymer in the polymer material. Typically, the flexural modulus of the VLDPE is between 40 MPa and 130 MPa, such as about 55 MPa or about 70 MPa or about 114 MPa. Typically, the flexural modulus of the LLDPE is between 150 MPa and 350 MPa, preferably between 180 MPa and 300 MPa, such as about 210 MPa or about 270 MPa. Typically, the density of the polymer material applied is between 0.90 g/cm$^3$ and 0.92 g/cm$^3$, such as about 0.909 g/cm$^3$, or about 0.911 g/cm$^3$, or about 0.913 g/cm$^3$ or about 0.916 g/cm$^3$. Memory of these flexible smooth-surfaced hoses of the invention is typically above 94,0%, such as between 95% and 96%. Elongation of said hoses of the invention is typically in the range 15%-70%, such as between 20% and 65%, preferably lower than 45%. Contraction of said flexible smooth-surfaced hoses of these exemplifying embodiments is typically 25% or less, preferably 22% or less, such as for example about 21% or about 14,5%, preferably 18% or less such as for example about 15% or about 8%.

In one embodiment, the profile according to the invention is generally S-shaped. See FIGS. 1, 5, 6 and 7 for examples of such generally S-shaped profiles. It is appreciated that many other shapes of profiles are equally applicable for being manufactured from a polymer material of the invention.

In an embodiment, a profile according to the invention has a substantially uniform or a non-uniform wall thickness d of between about 0.1 mm and 2.5 mm, preferably between about 0.3 mm and 0.7 mm, more preferably between about 0.35 mm and 0.65 mm, such as 0.40-0.50 mm. Typically, a profile of the invention has a uniform wall thickness of between about 0.45 mm and 0.75 mm, preferably between 0.55 mm and 0.65 mm, or a non-uniform wall thickness wherein the part or parts of the profile with the smallest wall thickness has/have a wall thickness of between about 0.35 mm and 0.7 mm. An example of a profile having a uniform wall thickness is shown in FIG. 1A, according to the invention. FIG. 1C shows a profile 3 of the invention wherein a lower laying part 24 has a smaller wall thickness d" than remaining parts of the profile such as the upper laying part 25 and the upstanding part 23, which have a wall thickness d'.

In an embodiment, the profile according to the invention comprises a first upstanding part 10 forming one end of the profile, connected to an upper laying part 15, in turn connected to a second upstanding part 13, in turn connected to a lower laying part 14, in turn connected to a third upstanding part 11 forming the other end of the profile, such that the first and second upstanding parts together with the upper laying part form a hollow upwards corrugation 17 adapted for receiving the third upstanding part 11 of a consecutive profile part. See FIG. 1A, B for an example of such a profile.

In an embodiment, the profile according to the invention has a wall thickness d of the profile which is non-uniform, with the wall thickness d of the upper laying part 15 and the lower laying part 14 being smaller than the wall thickness d of the upstanding parts 10, 11, 13, or vice versa. See FIG. 1C for an example of such a profile of the invention.

Figure 3A:
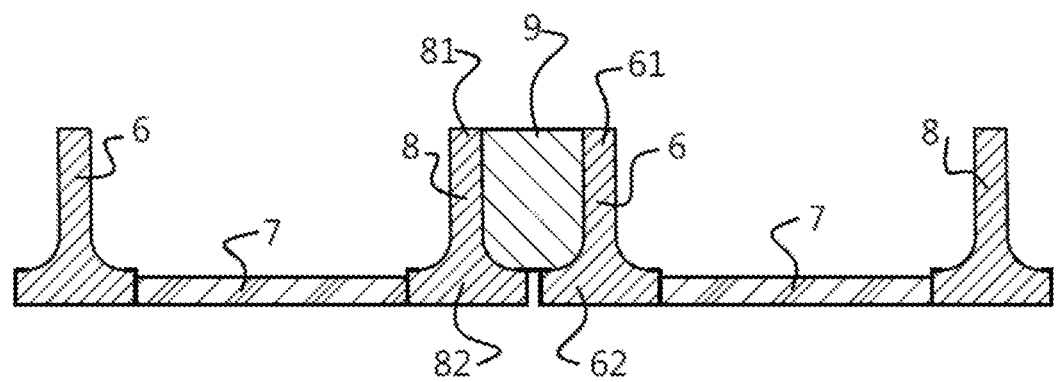
FIG. 3A-E. Examples of multi-component profiles which profiles are at least in part made from a polymer material according to the invention, such as for example a first component of the profile made from a polymer material of the invention with a second component made from a composition known in the art.

See FIG. 3A, B for a further exemplary profile of the invention manufactured with a polymer material of the invention. The profile of the invention, displayed in FIG. 3A, B comprises a web part 7, 47 and ends on both sides in upright parts 61, 81, 46, 48 which are provided with a horizontal leg 62, 82 that extends in line with the web part. For the profile of FIG. 3A, the upright parts 61 and 81 of adjacent windings in a hose wound from the profile, are part of a T-shaped part 6, 8. For the profile of FIG. 3B, the T-shaped parts in the upright parts 46 and 48 of adjacent windings in a hose wound from the profile, are folded towards each other on the top. Two consecutively spaced profile parts, i.e. profile parts spatially oriented side by side when the profile is spirally wound into a flexible hose of the invention, are welded with a weld 9, 49.

In an embodiment, the profile according to the invention comprises a web part 7 and ends on both sides in upright parts 6, 8 which are provided with a horizontal leg 62, 82 that extends in line with the web part, wherein the web part and/or the upright parts are produced from the polymer material of the invention or provided by the method of the invention. It is part of the invention that the overall wall thickness of such a profile is thinner than the wall thickness of profiles manufactured from a polymer or polymer blend currently available, according to the invention.

In an embodiment, the profile according to the invention comprises a web part 7 and ends on both sides in upright parts 6, 8, wherein the wall thickness d of the web part 7 is smaller than the wall thickness d of the upright parts 6, 8. For example, the web part 7 or the upright parts 6, 8 are made of the polymer material of the invention, thereby saving raw material polymer in the production of such profiles, according to the invention. Alternatively, both the web part 7 and the upright parts 6, 8 are made of the polymer material of the invention.

Figure 2A:
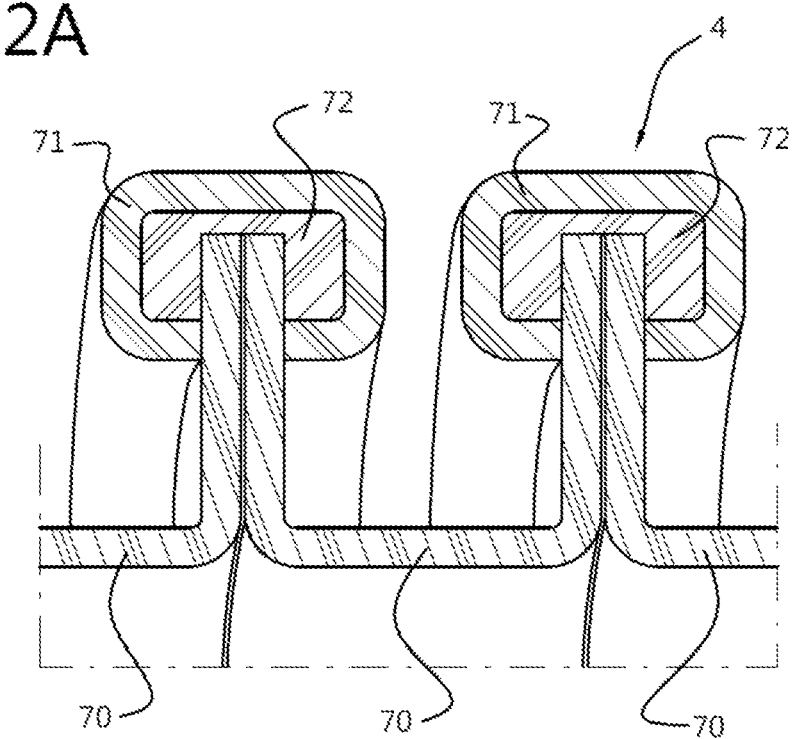
FIG. 2A-C display exemplary examples of three hoses at least in part made of a polymer material according to the invention; A. a hose "GX" comprising two profiles welded together, wherein for example the bottom U-shaped profile is made of a first polymer material of the invention and the top basically U-shaped cap profile is made of a second polymer material of the invention having a flexural modulus which is higher than the flexural modulus of the first polymer material. B. A hose "Hivac" for which for example the bottom profile is made of a first polymer material of the invention and the top basically U-shaped cap profile is made of a second polymer material of the invention. C. A hose "Spira", made from a "lectriflex" profile, which is basically an S-shaped profile comprising a chamber for a wire, i.e. an electrical wire.
Figure 2B:
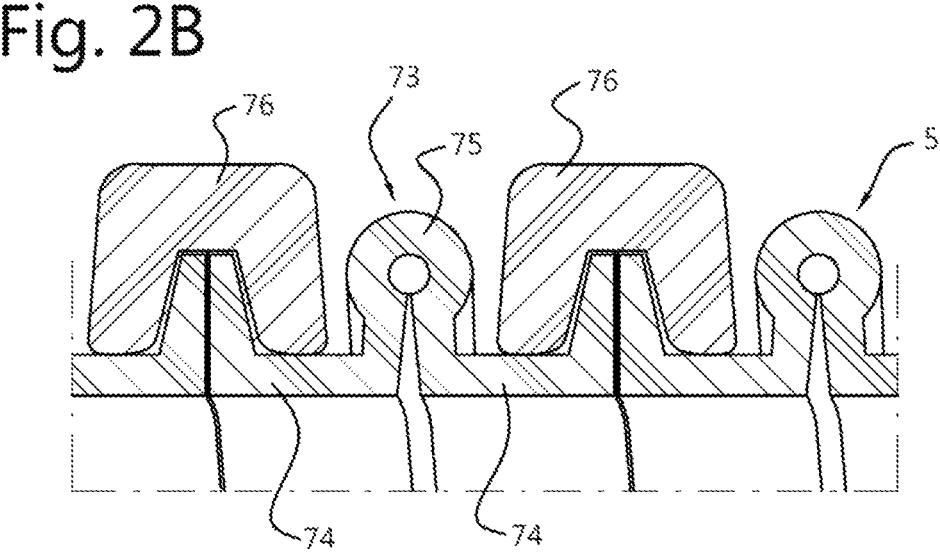

In an embodiment, the profile of the invention is a two-profile assembly 4 (See FIG. 2A for an example; referred to as "GX" profile, for manufacturing a "GX" hose).

A base U-shaped channel profile 70 is provided with a U-shaped cap profile 71 on top of it. The channel and the cap are welded together with a weld 72. It is part of the invention that either the channel, or the cap, or both the channel and the cap profiles are made of a polymer material of the invention. For example, the channel profile is made of a more flexible blend having a lower flexural modulus than the more rigid cap profile made of a blend having a higher flexural modulus, according to the invention. For example, both the channel and the cap are made of a blend comprising a PE as the first polymer and a PE as the second polymer, wherein the wt % of the first polymer is lower in the polymer material of which the channel profile is made than the wt % of the first polymer in the polymer material of which the cap profile is made. For comparison, a current GX hose (two profiles are welded together) has a diameter of 32 mm and a mass of around 290 g/m. By applying the polymer material of the invention for manufacturing such a GX hose, the reduction of the weight of the GX hose per meter is tens of percent lower, compared to the currently available GX hose, e.g. 220 g/m.

In an embodiment, the profile of the invention is a profile 5 similar to the GX profile described above (See FIG. 2B for an example; referred to as "Hivac" profile for manufacturing a "Hivac" hose), though the lower laying part 74 of the channel profile 73 now comprises a so-called "omega-shaped" fold 75. Again, the channel 73 and the cap 76 are for example made of the same polymer material of the invention, or are made of different polymer material of the invention. Alternatively, either the channel or the cap is made from a polymer material of the invention.

Figure 2C:
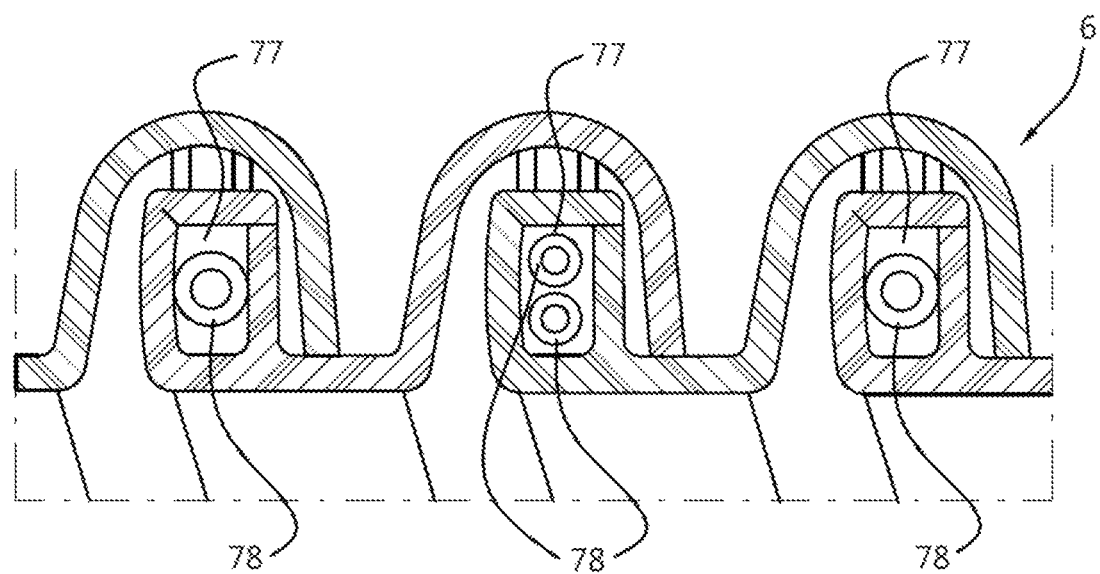

In an embodiment, the profile of the invention is an S-shaped profile 6 referred to as the "Spira" profile, or referred to as the "lectriflex" profile (See FIG. 2C for an example). Such a profile comprises a chamber 77 for receiving an electrical wire 78. Such at least one electrical wire is suitable for low Volt applications (smaller than 48 V), or is suitable for high-Volt applications (less than 380 V).

As said, numerous profiles and flexible hoses made thereof, are provided which are light-weight and thin-walled, according to the invention. For example, flexible hoses of the invention made from a generally S-shaped profile of the invention, wherein the profile is made of a polymer material of the invention, have a wall thickness of between about 0.25 mm and 0.75 mm, such as 0.50 mm or 0.61 mm, and a mass per meter hose of between about 150 g/m and 210 g/m, for example between about 120 g/m and 210 g/m, such as about 130 g/m or 200 g/m, according to the invention.

In an embodiment, a flexible hose of the invention is made of a profile according to the invention, said profile at least in part made of a polymer material of the invention and having the shape such as for example disclosed in international patent application WO 2011/051870 A1, FIGS. 3, 4, 7, 8, 9, 10, 12, 13, 15, 16, 17 and 19, which profiles of WO 2011/051870 A1 are herewith incorporated by reference in the current application.

In an embodiment, a spirally wound flexible hose of the invention is made of a profile according to the invention, said profile at least in part made of a polymer material of the invention and having the shape such as for example disclosed in U.S. Pat. No. 9,230,712 B2, FIGS. 1-17, which profiles of U.S. Pat. No. 9,230,712 B2 are herewith incorporated by reference in the current application.

In an embodiment, a profile of the invention is made by co-extruding an outer profile facing one side of the profile, and an inner profile, facing the opposite side of the profile, such that when the profile is for example wound into a spirally wound hose, the outer profile is facing the exterior of the flexible hose and the inner profile is facing the inside of the hose. Alternatively, a profile of the invention is made at least in part from one or more co-extrusion parts. For example, the bottom of a profile of the invention is made of a relatively flexible material and the remaining part of the profile is made of a different more stiff material, according to the invention.

Figure 3B:
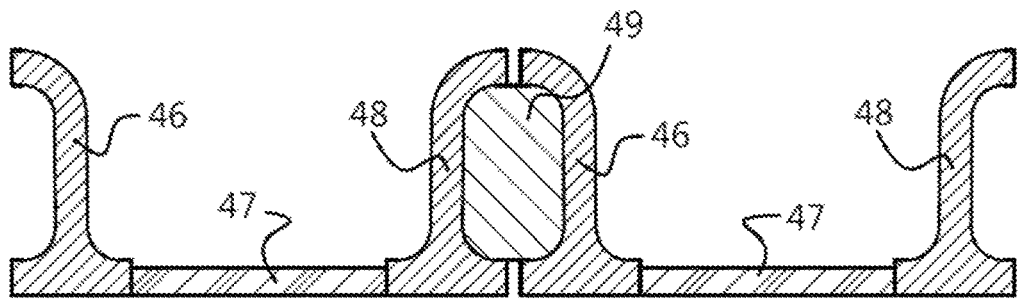
Figure 3C:
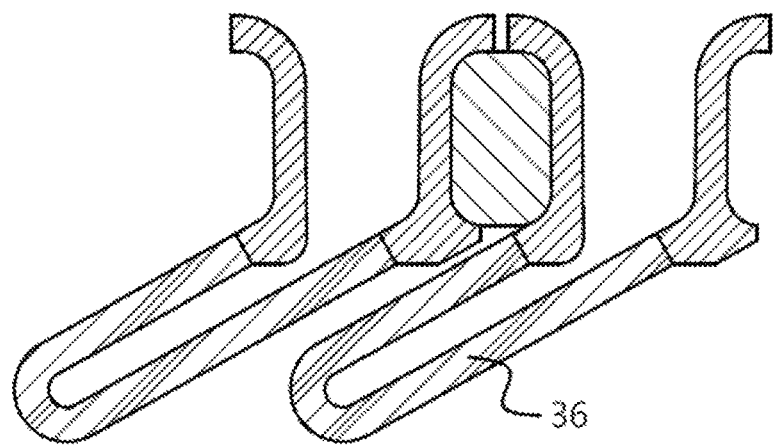
Figure 3D:
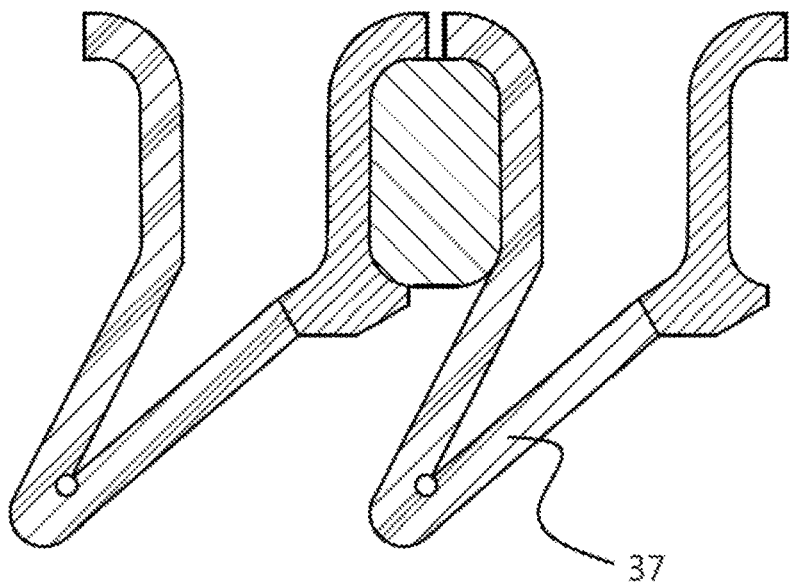
Figure 3E:
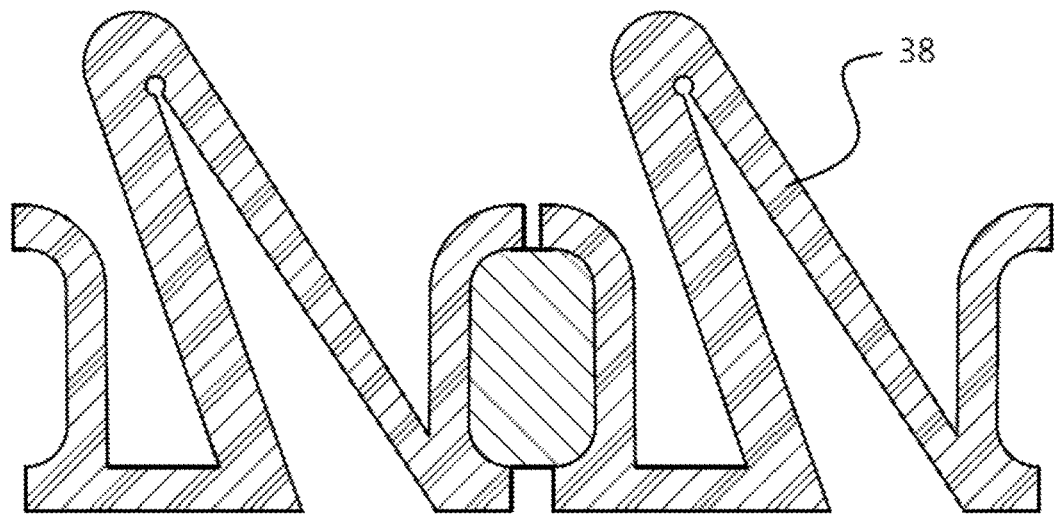
Figure 4:
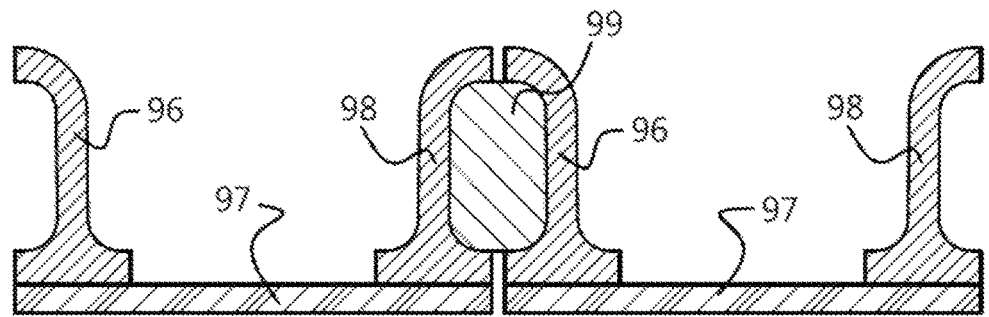
FIG. 4. Example of a flexible hose of the invention, wherein the polymer material of the invention is for example used for the upright parts of the profile and for the welding material and wherein another, predetermined composition, suitable for medical purposes, is used for the web part which forms the inside of the hose which comes into contact with the fluids transported via the hose.
Figure 5:
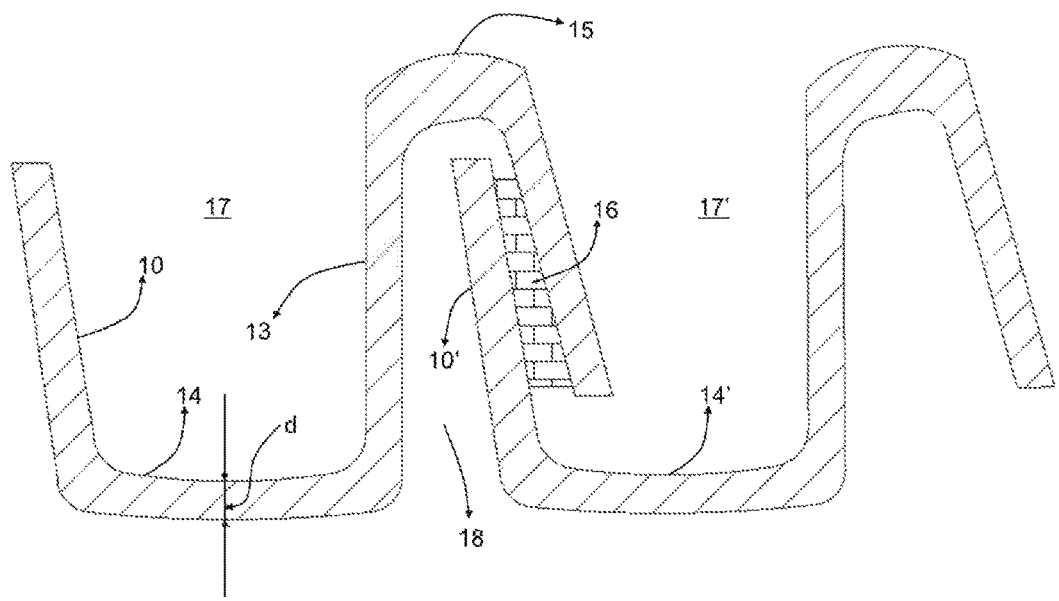
FIGS. 5 to 7 display exemplary generally S-shaped profiles of the invention, similar to that of FIG. 1A. The profile of FIG. 5 is called 'Reflex', the profile of FIG. 6 is called 'Bosun', and the profile of FIG. 7 is called 'BB flex'.

In one embodiment, a polymer material of the invention for manufacturing a so-called "MOS" profile of the invention is provided (See for example FIG. 3C-E of the current application, or FIGS. 14-16 of U.S. Pat. No. 9,230,712 B2, which are incorporated by reference), wherein the MOS profile is, at least in part, made of a polymer blend, i.e. a polymer material of the invention, having a higher flexural modulus than the flexural modulus of the polymer or polymer blend currently applied for producing the MOS profile, according to the invention.

Preferred is a profile according to the invention, wherein the profile has a substantially uniform wall thickness d or has a non-uniform wall thickness d of between 0.1 mm and 2.5 mm, preferably between 0.2 mm and 1.0 mm, more preferably d is between 0.3 mm and 0.8 mm, most preferably between 0.3 mm and 0.7 mm A sixth aspect of the current invention relates to a flexible hose comprising the polymer material according to the invention or the polymer material obtainable by the method of the invention. Preferred is a flexible hose of the invention, wherein the flexible hose comprises a profile of the invention.

Another preferred flexible hose, preferably a spirally wound hose, of the invention comprises a profile comprising a polymer material comprising a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa.

In one embodiment, the flexible hose of the invention is made from a profile which is spirally wound with consecutive windings of the profile secured to each other by means of a weld.

In one embodiment, the flexible hose of the invention is produced from a MOS profile of the invention, wherein the web part 47 comprises an unfoldable, or expandable, part 36 that is provided to be unfolded when an axial tensile force is exerted onto the hose, such as to provide for an elongation of the hose (See FIGS. 3B and C), or wherein the web part 47 comprises a collapsible part 37, 38 (See FIGS. 3B, D and E). For example, the web part 36, 37, 38 of such flexible hoses is made of a polymer material of the invention, preferably, the whole profile of such hoses is made of a polymer material of the invention. Typically, at least the web part is made of a polymer material of the invention, wherein the wall thickness of the profile at the location of the web part is between about 0.1 mm and 0.3 mm.

In one embodiment, the flexible hose of the invention has an inner diameter of the hose of between about 0.6 cm and 10.0 cm, preferably between about 2.5 cm and 5.0 cm, more preferably between about 3.0 cm and 4.0 cm. Typically, the inner diameter of a flexible hose of the invention for application with a vacuum cleaner is about 32 to 40 mm. Typically, the inner diameter of a flexible hose of the invention for application with a pool cleaner is between 35 mm and 40 mm such as about 40 mm, or about 38 mm. Flexible hoses of the invention having an inner diameter in these ranges are particularly suitable for application with for example a cleaner such as a vacuum cleaner, industrial applications, and swimming pool cleaning systems.

In one embodiment, the flexible hose of the invention has a weight which is less than 170 g/m, preferably between about 120 g/m and 150 g/m, more preferably between about 50 g/m and 140 g/m, most preferably between about 80 g/m and 130 g/m and the flexible hose of the invention has an inner diameter of the hose of about 32 mm. For example, the flexible hose of the invention has an inner diameter of about 32 mm, a uniform wall thickness of between 0.35 mm and 0.69 mm, preferably between 0.35 mm and 0.60 mm, such as about 0.47 mm and a mass per meter hose of 120 g/m and 150 g/m according to the invention. Such flexible hoses of the invention are particularly suitable for application in, for example, a vacuum cleaner system. For example, the flexible hose of the invention has an inner diameter of about 34 mm, a uniform wall thickness of between 0.50 mm and 0.67 mm and a mass per meter hose of 150 g/m and 210 g/m according to the invention.

In one embodiment, the flexible hose of the invention has a memory which is at least about 85%, preferably between 90% and 100%, more preferably between 92% and 99,5%, most preferably between 94% and 99%. A flexible hose of the invention has a preferred memory of for example 94%, 95%, 96%, 97%, or 98%, or any value in between these values. A flexible hose of the invention having such a memory which is similar or the same as the memory of flexible hoses currently on the market for use with e.g. vacuum cleaners or swimming pool cleaners, has a thinner wall thickness than such currently available hoses, according to the invention. Thus, one of the many advantages of the current invention, is the provision of a flexible hose which has a lower weight per meter hose than current flexible hoses, while the memory of such hoses of the invention is similar or the same. Furthermore, it is also part of the invention that the memory of a flexible hose of the invention is improved compared to the memory of current flexible hoses, by providing a flexible hose of the invention with the same or, at least in part, a smaller wall-thickness than the wall thickness of current flexible hoses. In addition to these beneficial characteristics of the thin-walled hoses of the invention, the hoses of the invention are also remarkably smooth, in spite the application of a polymer material for manufacturing the hose, having a relatively high melt index, i.e. over 1.0 g/10 min, such as about 1.5 g/10 min-2.5 g/10 min, preferably about 2.0 g/10 min.

In one embodiment, the flexible hose of the invention resists vacuum of 400 millibar at the inside of the hose without forming a kink while bended. Herewith, the flexible hose of the invention has a resistance against vacuum of 400 millibar which is at least similar as obtained with a common flexible hose currently available. Thus, the flexible hose of the invention has the same strength or is even stronger with regard to resistance against vacuum when compared to current flexible hoses.

In one embodiment, the flexible hose of the invention resists vacuum of 900 mbar at the inside of the hose without forming a kink while bended, and resists vacuum of 900 mbar at the inside of the hose when the hose is kept in a straight position. Flexible hoses of the invention that do not collapse when kept at vacuum of 900 mbar are typically used for pool cleaning applications applying a pool cleaner.

In one embodiment, the flexible hose of the invention displays a flexural fatigue, also referred to as "flex life", which is at least about 40.000 cycles, preferably between about 40.000 cycles and 400.000 cycles, according to the standardized repeated bending test (IEC 60312-1, Edition 1.0 (2010), N° 6.9 (2.5 kg)). With such flex life of the flexible hose of the invention, said flexible hose has a lifespan that is at least as long as the lifespan of current flexible hoses such as hoses made of a polymer blend comprising an ethylene-vinyl acetate (EVA), according to the invention, i.e. a flex life of about 40.000 cycles. Moreover, with a flex life of about 60.000 to 250.000 cycles, for example between about 100.000 cycles and 250.000 cycles, the flexible hose of the invention performs surprisingly better than many of the current flexible hoses, such as EVA/PE hoses.

Flex life is assessed according to standardized test: repeat bending of a flexible hose of the invention according to the test protocol of IEC 60312-1, Edition 1.0 (2010), N° 6.9 (2.5 kg>40 000 cycles). All flexible hoses of the invention subjected to such standardized flex-life test displayed a flex-life that is at least equal to, and in most occasions even better than the flex-life of flexible hoses currently available for vacuum cleaners, pool cleaners, respiratory devices, etc., i.e. current relatively heavy flexible hoses made of a blend of EVA/PE. Improved flex-life of a flexible hose of the invention is obtained with a flex-life of far beyond 40.000 cycles, i.e. up to as high as 250.000 cycles or even more cycles, according to the invention.

In one embodiment, the flexible hose of the invention is a spirally wound hose with an inner diameter of about 32 mm, and wherein the weight of the hose is between 120 g/m and 150 g/m per meter hose, the memory is between about 90% and 98%, the hose resists vacuum of 400 millibar or of 310 millibar, preferably of 400 millibar, at the inside of the hose without forming a kink while bended, the flex life of the hose is at least about 40.000 cycles, preferably between about 40.000 cycles and 250.000 cycles, according to the standardized repeated bending test (IEC 60312-1, Edition 1.0 (2010), N° 6.9 (2.5 kg)), the flexural modulus of the polymer material of which the hose is produced is less than about 250 MPa, preferably between about 180 MPA and 250 MPa.

In one embodiment, the flexible hose of the invention is a spirally wound hose with an inner diameter of about 38 mm, and wherein the weight of the hose is between 150 and 210 g/m, the memory is at least about 85%, preferably between 94,0% and 98%, more preferably higher than 94,5%, wherein the hose resists vacuum of 900 millibar at the inside of the hose, the flex life of the hose is at least about 40.000 cycles, preferably between about 60.000 cycles and 250.000 cycles, according to the standardized repeated bending test (IEC 60312-1, Edition 1.0 (2010), N° 6.9 (2.5 kg)).

In one embodiment, the flexible hose of the invention is a spirally wound hose with an inner diameter of about 38 mm, and wherein the weight of the hose is between 150 and 210 g/m, the memory is at least about 85%, preferably between 94,0% and 98%, more preferably higher than 94,5%, wherein the hose resists vacuum of 900 millibar at the inside of the hose, the flex life of the hose is at least about 10.000 cycles, preferably between about 60.000 cycles and 250.000 cycles, according to the standardized repeated bending test (IEC 60312-1, Edition 1.0 (2010), N° 6.9 (2.5 kg)). Such as hose is typically applicable as a pool hose.

For example, a flexible hose of the invention is made of a profile such as displayed in any of the FIGS. 1-4, wherein the first polymer is a VLDPE and the optional second polymer is a PE. For example, a flexible hose of the invention furthermore is made of a profile made of a polymer material of the invention wherein the second polymer is an LLDPE. Typically, a flexible hose of the invention has a memory of between 92% and 96%, such as 93%, 94%, 95% or 96% according to the invention. Typically, the flexural fatigue (or flex life) of a flexible hose of the invention is 50.000 cycles or higher, preferably between about 60.000 cycles and 250.000 cycles, or higher. It is now due to the current invention that it has become possible to provide a flexible smooth-surfaced hose with a surprisingly largely reduced wall thickness, thus producible at reduced costs since raw material consumption is lowered, while abovementioned achieved technical specifications, e.g. flex life, memory, remain similar to, or are better than those technical specifications desired for current thick-walled flexible hoses produced from nowadays available blends or polymers such as blends comprising up to 30-50 wt % EVA based on the total weight of the polymers in said blend.

In one embodiment, the flexible hose of the invention is made from two or more profiles, such as three profiles (See example of hoses made of two profiles in FIG. 2A, 2B, 3A-D, 4; see for example in U.S. Pat. No. 4,310,946, column 4, line 50-52 and FIG. 3 (incorporated by reference), an example of a hose made of three profiles; see for example in U.S. Pat. No. 7,226,519 B2 FIGS. 8 and 9 incorporated by reference) for a further example of a hose made of three profiles).

For example, a flexible hose of the invention is made of a multiple-pitch profile, for example a profile of the same type as shown in the drawings, but comprising two or more corrugations per winding. Alternatively, a flexible hose of the invention is made of multiple profiles welded together.

In one embodiment, the flexible hose is provided by spirally welding a profile of the invention together. Welding of a profile of the invention to provide for a flexible hose of the invention is performed by applying suitable welding material known in the art. For example, welding of a profile of the invention is conducted with the use of a polymer material of the invention, for example, the polymer material of the invention applied for manufacturing the profile.

In an embodiment, the flexible hose of the invention is made from one or more profiles according to the invention, wherein at least one profile is made from a polymer material of the invention and wherein during manufacturing of the profile said manufacturing process comprised the step of foaming of the profile. This way, due to the foaming of the polymer material of the invention during manufacturing of the profile, a further weight reduction of the profile is achieved, apart from the weight reduction related to the application of a polymer material of the invention.

A preferred flexible hose of the invention is a spirally wound hose with an inner diameter of between 31 mm and 39 mm, such as for example about 38 mm, and wherein the weight of the hose is between 120 g/m and 220 g/m, the memory is between about 93% and 98%, the hose resists vacuum of 400 millibar at the inside of the hose without forming a kink while bended, the flex life of the hose is at least 40.000 cycles, preferably between 100.000 cycles and 500.000 cycles, according to the standardized repeated bending test (IEC 60312-1, Edition 1.0 (2010), N° 6.9 (2.5 kg)), and the flexural modulus of the polymer material of which the hose is produced is 300 MPa or less, preferably between 80 MPa and 250 MPa, more preferably between 120 MPa and 230 MPa, and the melt index of said polymer material is between 1.2 g/10 min and 5 g/10 min, preferably between 1.8 g/10 min and 3 g/10 min.

Another preferred flexible hose, preferably a spirally wound hose, of the invention comprises a profile comprising a polymer material comprising a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, said flexible hose having an inner diameter of between 31 mm and 39 mm, such as about 32, 33,7, 34 or 36.5 mm, and wherein the weight of the hose is between 80 g/m and 220 g/m, the memory is between about 90% and 98%, preferably between about 93% and 98%, the hose resists vacuum of 400 millibar at the inside of the hose without forming a kink while bended, the flex life of the hose is at least 40.000 cycles, preferably at least 100.000 cycles, according to the standardized repeated bending test (IEC 60312-1, Edition 1.0 (2010), N° 6.9 (2.5 kg)), and the melt index of said polymer material is between 0.3 g/10 min and 2 g/10 min, preferably between 0.7 g/10 min and 2 g/10 min.

Another preferred flexible hose, preferably a spirally wound hose, of the invention comprises a profile comprising a polymer material comprising a first polyethylene and a second polyethylene, wherein the first polyethylene is a very low-density polyethylene and the second polyethylene is a linear low-density polyethylene, wherein the first polyethylene and the second polyethylene are the sole polymers in the polymer material, wherein the flexural modulus of said first polyethylene is between 5 MPa and 500 MPa and wherein the flexural modulus of said second polyethylene is between 5 MPa and 500 MPa, such that the flexural modulus of the polymer material is between 100 MPa and 250 MPa, preferably between 120 and 230 MPa, said flexible hose having:
  (a) an inner diameter of between 31 and 33 mm, such as about 32 mm, and a weight of the hose of between 80 g/m and 160 g/m;
  (b) an inner diameter of between 33 and 35 mm, such as about 33.7 mm or 34 mm, and a weight of the hose of between 130 g/m and 210 g/m; or
  (c) an inner diameter of between 35 and 37 mm, such as about 36.4 mm, and a weight of the hose of between 150 g/m and 220 g/m,
wherein the memory is between about 90% and 98%, preferably between about 93% and 98%, the hose resists vacuum of 400 millibar at the inside of the hose without forming a kink while bended, the flex life of the hose is at least 40.000 cycles, preferably at least 100.000 cycles, according to the standardized repeated bending test (IEC 60312-1, Edition 1.0 (2010), N° 6.9 (2.5 kg)), and the melt index of said polymer material is between 0.3 g/10 min and 2 g/10 min, preferably between 0.7 g/10 min and 2 g/10 min.

In one embodiment, the flexible hose according to the invention has a weight of less than 220 g/m, preferably between 210 g/m and 110 g/m, more preferably between 200 g/m and 120 g/m, most preferably between 160 g/m and 120 g/m, and wherein the inner diameter of the flexible hose is between 25 mm and 50 mm, preferably between 30 mm and 42 mm, more preferably between 32 mm and 38 mm. In an embodiment, the flexible hose according to the invention has a weight of between 160 g/m and 120 g/m and the inner diameter of said flexible hose is 32 mm or the weight of said flexible hose is between 210 g/m and 160 g/m and the inner diameter of said flexible hose is 38 mm.

Particularly preferred is the flexible hose according to the invention, wherein the memory of said flexible hose is at least 85%, preferably between 88% and 100%, more preferably between 92% and 99,5%, most preferably between 94% and 99%, such as between 88% and 98%.

A flexible hose, wherein said flexible hose resists vacuum of 400 millibar at the inside of the flexible hose without forming a kink while bended is also part of the invention.

In one embodiment, the flexible hose according to the invention is a hose with flex life of at least 10.000 cycles, such as at least 40.000 cycles, preferably between 40.000 cycles and 1.000.000 cycles, more preferably between 100.000 cycles and 250.000 cycles, according to the standardized repeated bending test (IEC 60312-1, Edition 1.0 (2010), N° 6.9 (2.5 kg)).

Thus, summarizing the many benefits of the current invention, a flexible hose is provided based on the surprising insight that by
1) selecting the proper combination of a first PE and optionally a second PE in a polymer material of the invention;
2) adjusting the weight percentages of said PE polymers, such VLDPE and LLDPE, in the polymer material of the invention;
3) adjusting the thickness of the profile of the invention with a predetermined selected shape; and
4) selecting the diameter of the flexible hose of the invention made from said profile,
a flexible hose of the invention is provided which has the advantageous properties with regard to:
a) memory of over 88%, e.g. 90%, 92%, 94,0%, 94,5% or 95,6%;
b) resistance to hose collapsing while bend and brought under vacuum of 400 millibar or 310 millibar at the inside of the hose ("hose collapsing test");
c) flex life, e.g. over 40.000 cycles, such as up to 100.000 cycles or even 250.000 cycles, or e.g. at least 10.000 cycles such as about 10.000 cycles when for example used as a pool hose;
d) minimum required profile wall thickness resulting in reduced weight per meter hose, i.e. less than 0.67 mm such as for example 0.66 mm, 0.62 mm, 0.58 mm, 0.56 mm and 0.54 mm, 0.50 mm, 0.45 mm, 0.40 mm, 0.35 mm;
e) density of the polymer material of the invention between 0.905 g/cm$^3$ and 0.925 g/cm$^3$ preferably between 0.910 g/cm$^3$ and 0.916 g/cm$^3$; and
f) weight of the flexible hose of the invention in g/m, with a given hose inner diameter and hose outer diameter ('profile height').

For example, a LLDPE is applied in the method of the invention or is comprised by the polymer material of the invention, having a density of between 0.915 g/cm$^3$ and 0.925 g/cm$^3$; for example, a VLDPE is applied in the method of the invention or is comprised by the polymer material of the invention, having a density of between 0.88 g/cm$^3$ and 0.915 g/cm$^3$.

More specifically, a flexible hose is provided based on the surprising insight that by
1) selecting VLDPE and LLDPE having specific flexural moduli and melt indices;
2) adjusting the weight percentages of VLDPE and LLDPE;
3) adjusting the thickness of the profile of the invention with a predetermined selected shape; and
4) selecting the diameter of the flexible hose of the invention made from said profile, a flexible hose of the invention is provided which has the advantageous properties with regard to:
a) memory of over 92%, 94,0%, 94,5% or 95,6%;
b) resistance to hose collapsing while bend and brought under vacuum of 400 millibar or 310 millibar at the inside of the hose ("hose collapsing test");
c) flex life, e.g. over 40.000 cycles, such as over 100.000 cycles;
d) minimum required profile wall thickness resulting in reduced weight per meter hose, i.e. less than 0.67 mm such as for example 0.66 mm, 0.62 mm, 0.58 mm, 0.56 mm and 0.54 mm, 0.50 mm, 0.45 mm, 0.40 mm, 0.35 mm;
e) density of the polymer material of the invention between 0.905 g/cm$^3$ and 0.925 g/cm$^3$ preferably between 0.910 g/cm$^3$ and 0.918 g/cm$^3$; and
f) weight of the flexible hose of the invention in g/m, with a given hose inner diameter and hose outer diameter ('profile height').

For example, for application of a hose of the invention as a hose for use in a vacuum cleaner system, the memory is 94% or better.

For example, for application of a hose of the invention as a hose for use as a pool hose, the memory is 88% or better.

A seventh aspect of the current invention relates to a vacuum cleaning system, a swimming pool cleaning system, a heating system such as a central heating system for households, a medical system such as a respiratory system, an apparatus, an industrial line, comprising a flexible hose of the invention. A flexible hose of the invention is particularly suitable for application in such systems, apparatuses and lines, due to the combination of the light weight per meter hose, the relatively high flex life, resistance to 400 mbar vacuum or 310 mbar vacuum or 900 mbar vacuum, memory, compared to current flexible hoses now commonly applied for such systems, etc. Application of a polymer material of the invention for manufacturing a profile of the invention, which profile in turn is applied for manufacturing a flexible hose of the invention now thus provides for significant weight savings with regard to the weight per meter hose with a given diameter of the hose, corresponding to significantly reduced consumption of raw materials when producing such hoses of the invention. Moreover, in addition to the light weight of the flexible hose of the invention, related to thinner wall thickness when compared to the wall thickness of current hoses and related to lower density of the polymer material of the invention, measures such as memory and flex life are similar at least for the flexible hose of the invention when compared to current flexible hoses, and compared to many of the current hoses, are significantly improved.

An eighth aspect of the current invention relates to a vacuum cleaning system comprising a flexible hose of the invention.

A ninth aspect of the current invention relates to a swimming pool cleaning system comprising a flexible hose of the invention.

A tenth aspect of the current invention relates to a medical system comprising a flexible hose of the invention. In one embodiment, the medical system comprising a flexible hose according to the invention is a respiratory system, comprising one or more flexible hoses of the invention. As an example a flexible hose for such a medical system may generally be formed of a profile of the type of FIG. 4, wherein the polymer material of the invention is used for the upright parts 96, 98 of the profile and the welding material 99 and wherein another, predetermined composition, suitable for medical purposes, is used for the web part 97 which forms the inside of the hose which comes into contact with the fluids transported via the hose.

While the invention has been described in terms of several embodiments, it is contemplated that alternatives, modifications, permutations and equivalents thereof will become apparent to one having ordinary skill in the art upon reading the specification and upon study of the drawings. The invention is not limited in any way to the illustrated embodiments. Changes can be made without departing from the scope which is defined by the appended claims.

The invention is further illustrated by the following examples, which should not be interpreted as limiting the present invention in any way.

EXAMPLES

Polymer blends comprising a first PE and a second PE, wherein the first PE is VLDPE and the second PE is LLDPE, were prepared. Profiles of the invention were made of these polymer blends, and flexible hoses of the invention were made with these profiles, i.e. spirally wound flexible hoses, wherein consecutive windings of the profile are welded together using the polymer material of which the profile was made (Examples C-F and H-K).

In addition, profiles and hoses, not according to the invention, were prepared by using polymer blends comprising EVA or only comprising a single PE (Comparative Examples A, B, G and L-N).

Figure 6:
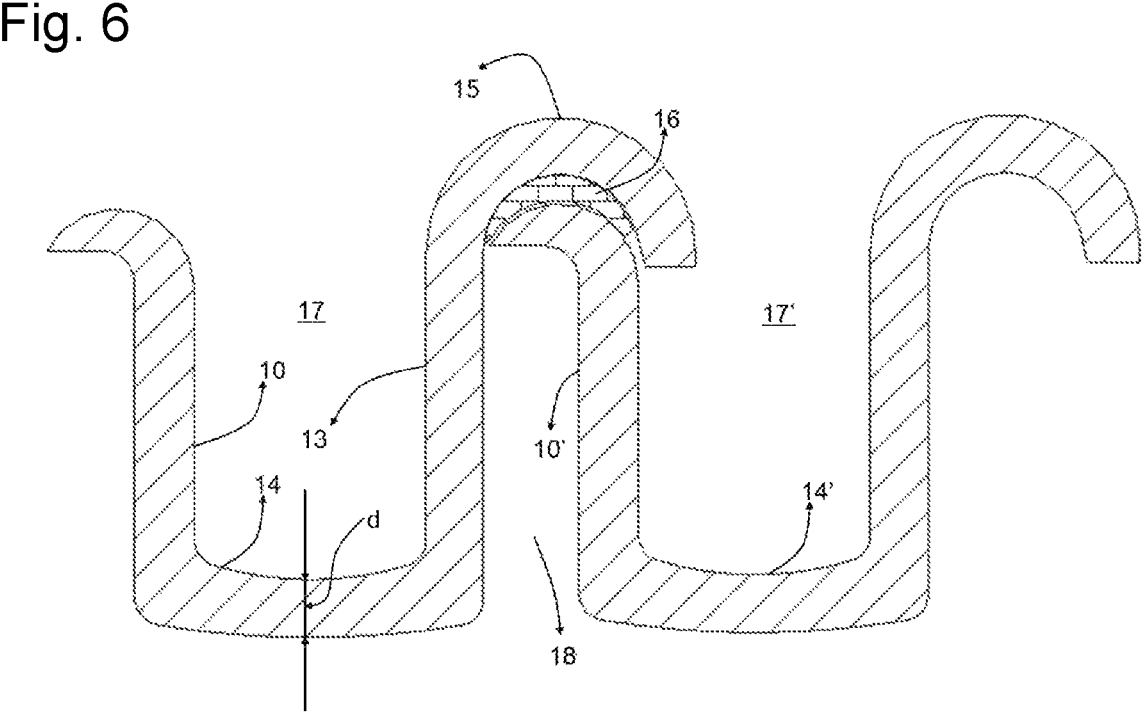
Figure 7:
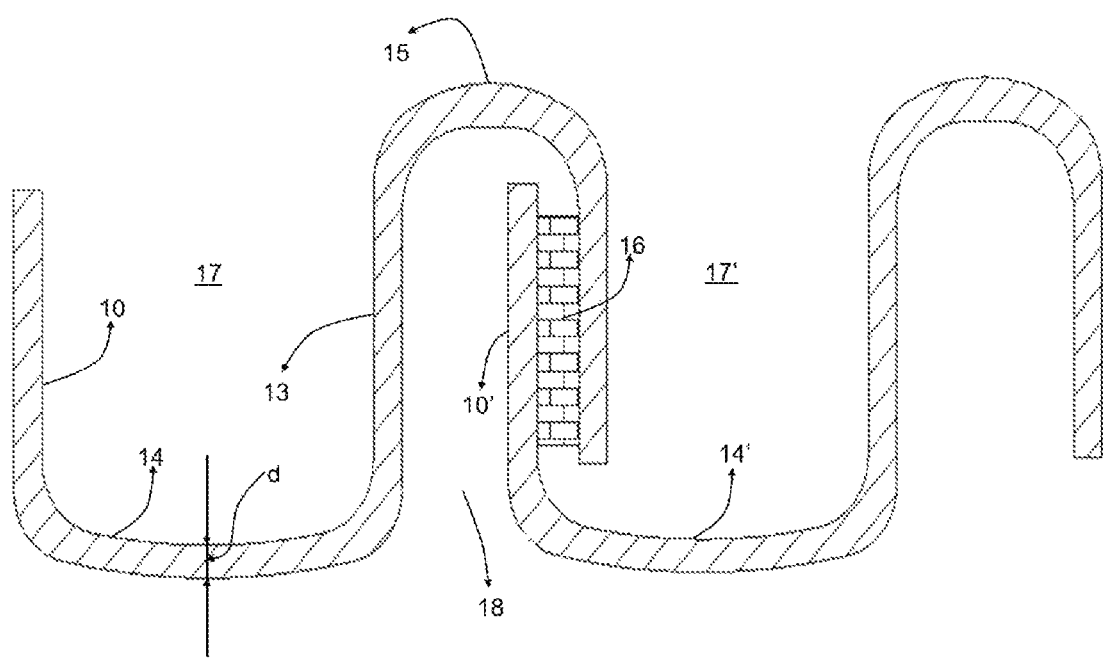

The type of profile prepared was either BB flex (see FIGS. 1A, 1B and 7), Reflex (see FIG. 5) or Bosun (FIG. 6). The individual polymers and blends used to manufacture the profiles and hoses were characterized by their densities, melt indices and flexural moduli.

The flexible hoses prepared were characterized by their flex life, elongation, contraction, memory and their resistance to a vacuum of 400 millibar at the inside of the hose without forming a kink while bended.

Flex life of manufactured flexible hoses was tested according to standard test protocol, i.e. the standardized repeated bending test (IEC 60312-1, Edition 1.0 (2010), N° 6.9 (2.5 kg)).

Melt index of the materials was determined in accordance standard ASTM D1238-13.

Memory of the flexible hoses having an initial outer diameter d1, was determined in accordance with a test wherein a load of 700 N is applied to the flexible hose between two plates of 80×80 mm for 10 seconds at a temperature of 20° C., and wherein the resistance against deformation (the memory) is calculated from $d2/d1*100\%$, wherein d2 is the outer diameter of the flexible hose 1 minute after removing the load.

The 'elongation' of the flexible hoses was measured by vertically attaching a flexible hose of about 60 cm length at a first end to a base, marking on the hose a length of 50 cm, attaching a load of 5 kg at the second end of the flexible hose and measuring the extension of the initial length of 50 cm under load in %, 30 second after applying the load.

The 'contraction' of the flexible hoses was measured by marking a length of 50 cm on a flexible hose of about 60 cm length, closing one opening of the flexible hose with a plug, applying a vacuum of 280 mbar at a temperature of 20° C. to the inside of the flexible hose via the second opening and measuring the contraction of the initial length of 50 cm under vacuum in %, 60 seconds after applying the vacuum.

Results are presented in Table 1 and Table 2.

TABLE 1

Examples of polymer blends for use in profiles according to the invention, and comparative examples.

| Example | Polymers | Density (g/cm³) | Flex, modulus of polymer/blend (MPa) | wt % in blend, (based on total weight of polymer) | Melt Index (g/10 min) |
|---|---|---|---|---|---|
| Comparative Example A: Blend comprising EVA 4.5%, VLDPE and LLDPE. BB flex profile, for a vacuum cleaner hose. | | | | | |
| | | | 148 | | |
| Comparative Example B, a typical blend currently used, comprising EVA 4.5%. BB flex profile, vacuum cleaner hose. | | | | | |
| | EVA | 0.928 | 170 | 45.0 | 1 |
| | VLDPE | 0.9 | 70 | 40.0 | 0.75 |
| | LLDPE | 0.922 | 270 | 15.0 | 1.4 |
| Total | | 0.917 (§) | 145 | 100.0 | 1.12 (§) |
| Example C: Blend with two PEs (no EVA) and melt index of 2 g/10 min. BB flex profile for a hose for a vacuum cleaner | | | | | |
| | VLDPE | 0.9 | 55 | 50.0 | 2 |
| | LLDPE | 0.918 | 210 | 50.0 | 2 |
| Total | | 0.909 (§) | 133 | 100.0 | 2 (§) |
| Example D: Blend with two PEs (no EVA) with relatively higher flex modulus than the blend of example C. BB flex profile for a hose for a vacuum cleaner | | | | | |
| | VLDPE | 0.9 | 55 | 50.0 | 2 |
| | LLDPE | 0.922 | 270 | 50.0 | 1.4 |
| Total | | 0.911 (§) | 163 | 100.0 | 1.7 (§) |

TABLE 1-continued

Examples of polymer blends for use in profiles according to the invention, and comparative examples.

| Example | Polymers | Density (g/cm³) | Flex, modulus of polymer/blend (MPa) | wt % in blend, (based on total weight of polymer) | Melt Index (g/10 min) |
|---|---|---|---|---|---|
| Example E: Blend with two PEs (no EVA) with relatively higher flex modulus than the blends of Examples C and D. Reflex profile for vacuum cleaner hose. | | | | | |
| | VLDPE | 0.9 | 55 | 40.0 | 2 |
| | LLDPE | 0.922 | 270 | 60.0 | 1.4 |
| Total | | 0.917 [§] | 184 | 100.0 | 1.64 [§] |
| Example F: Blend with two PEs (no EVA) with relatively increased flexural modulus compared to Examples C, D and E. BB flex type of profile, pool hose | | | | | |
| | VLDPE | 0.91 | 114 | 40.0 | 2 |
| | LLDPE | 0.921 | 270 | 60.0 | 1.4 |
| Total | | 0.919 [§] | 208 | 100.0 | 1.64 [§] |
| Comparative Example G: Hose for a pool cleaner/vacuum cleaner, manufactured from a single PE, here LLDPE. PE Reflex profile. | | | | | |
| | LLDPE | 0.920 | 230 | 100% | 1 |
| Example H: Blend with two PEs (no EVA). Bosun and BB flex type profiles, hose for a vacuum cleaner and pool. | | | | | |
| | VLDPE | 0.900 | 55 | 40.0 | 2 |
| | LLDPE | 0.918-0.920 | 270 | 60.0 | 1.3 |
| Total | | 0.917 [§] | 184 | 100.0 | 1.59 [§] |
| Example I: Blend with two PEs (no EVA). Bosun and BB flex type profiles, hose for a vacuum cleaner and pool. | | | | | |
| | VLDPE | 0.900 | 55 | 40.0 | 2 |
| | LLDPE | 0.918-0.920 | 270 | 60.0 | 2 |
| Total | | 0.917 [§] | 184 | 100.0 | 2 [§] |
| Example J: Blend with two PEs (no EVA). Bosun and BB flex type profiles, hose for a vacuum cleaner and pool. | | | | | |
| | VLDPE | 0.912 | 120 | 50.0 | 1.1 |
| | LLDPE | 0.918-0.922 | 270 | 50.0 | 1.4 |
| Total | | 0.918 [§] | 195 | 100.0 | 1.2 [§] |
| Example K: Blend with two PEs (no EVA). Bosun and BB flex type profiles, hose for a vacuum cleaner and pool. | | | | | |
| | VLDPE | 0.9 | 55 | 35.0 | 2 |
| | LLDPE | 0.918-0.924 | 270 | 65.0 | 1.4 |
| Total | | 0.918 [§] | 195 | 100.0 | 1.6 [§] |
| Comparative Example L: Blend comprising EVA 4.5%. Reflex or BB flex profile for vacuum cleaner hose. | | | | | |
| | EVA | 0.928 | 170 | 45.0 | 1 |
| | VLDPE | 0.9 | 70 | 40.0 | 1.4 |
| | LLDPE | 0.922 | 270 | 15.0 | 0.75 |
| Total | | 0.916 [§] | 145 | 100.0 | 1.12 [§] |
| Comparative Example M: Blend comprising EVA 4.5%. Reflex or BB flex profile for vacuum cleaner hose. | | | | | |
| | EVA | 0.928 | 170 | 45.0 | 1 |
| | VLDPE | 0.9 | 70 | 15.0 | 1.4 |
| | LLDPE | 0.922 | 270 | 40.0 | 0.75 |
| Total | | 0.924 [§] | 195 | 100.0 | 0.85 [§] |
| Comparative Example N: Blend comprising EVA 4.5%. Reflex or BB flex profile for vacuum cleaner hose. | | | | | |
| | EVA | 0.928 | 170 | 65.0 | 1 |
| | LLDPE | 0.922 | 270 | 35.0 | 0.75 |
| Total | | 0.926 [§] | 205 | 100.0 | 0.9 [§] |

[§] Estimate

TABLE 2

Examples C to G of hoses of polymer blends and polymer materials according to the invention, and comparative examples A, B, G and L-N.

| Example | Weight (g/m hose) | Internal diameter (mm) | ROD (profile height) (inch) | Memory (%) | Elongation (%) | Contraction (%) | Wall thickness (mm) | Flex life (cycles) | Forming kink while bended under vacuum of 400 mbar? |
|---|---|---|---|---|---|---|---|---|---|
| Com. A | 170 | 32.3 | 0.145 | 94 | ND (#) | ND (#) | 0.5-0.7 | >4·10$^4$ (*) | No |
| Com. B | 185 | 33.7 | 0.142 | 95.3 | 48 | 24 | 0.66 | >4·10$^4$ (*) | No |
| C | 201 | 34.7 | 0.158 | 95.3 | 52 | 23 | 0.61 | >10$^5$ | No |
| D | 163 | 34 | 0.143 | 95.3 | 64 | 23 | 0.58 | >10$^5$ | No |
| E | 150 | 33.7 | 0.136 | 94.6 | 20 | 14.5 | 0.51 | >10$^5$ | No |
| F | 206 | 36.5 | 0.171 | 95.6 | 26 | 21 | 0.66 | >10$^5$ | No |
| Com. G | 182 | 36.5 | 0.165 | 89 | 28 | 16 | 0.45 | >10$^5$ | No |
| H | 145 | 32 | 0.156 | 94.6 | ND (#) | ND (#) | 0.50 | >10$^5$ | No |
| I | 145 | 32 | 0.156 | 94.6 | ND (#) | ND (#) | 0.50 | >10$^5$ | No |
| J | 130 | 32 | 0.148 | 95.5 | 35 | 19 | 0.55 | >10$^5$ | No |
| K | 130 | 32 | 0.148 | 95.5 | 35 | 19 | 0.55 | >10$^5$ | No |
| Com. L | 150 | 33.7 | 0.145 | ND (#) | ND (#) | ND (#) | 0.61 | >5·10$^4$ | Yes |
| Com. M | 150 | 33.7 | 0.150 | ND (#) | ND (#) | ND (#) | 0.55 | <4·10$^4$ | No |
| Com. N | 150 | 33.7 | 0.145 | ND (#) | ND (#) | ND (#) | 0.52 | <4·10$^4$ | No |

(#) ND: not determined
(*) Since flex life testing was discontinued after 40.000 cycles, the flex life of the flexible hose was thus at least 40.000 cycles.

As indicated in Table 2, the flex life of the hoses made of profiles according to the invention was over 100.000 cycles. The surface of the hoses made of profiles according to the invention was smooth; co-extrusion of the polymer material during manufacturing of the profiles from which the hoses are manufactured, together with a further smooth polymer material, was not required.

The hoses of Comparative Examples A and B have a relatively high weight per meter hose (given the diameter of the hose). The hose of Comparative Example G has lower memory. The hose of Comparative Example L forms a kink while bended when an internal vacuum of 400 mbar is applied. The hoses of Comparative Examples M and N have insufficient flex life.

The hoses, with different diameters, made of profiles according to the invention have a low weight per meter hose while retaining excellent memory, flex life and resistance against forming a kink while bended under a vacuum of 400 millibar at the inside of the hose.

As regards Example I it was concluded that due to the high melt indices of the two polyethylenes, the outer surface of the profile was smooth. The higher melt index for the applied LLDPE in Example I as compared to the melt index of the LLDPE applied in the hose made in Example H, did not result in different material and product characteristics when flexural modulus, weight of the hose in g/m, memory and smooth surface are considered.

The invention claimed is:

1. A flexible hose comprising a profile which is spirally wound with consecutive windings of the profile secured to each other by means of a weld, the profile comprising a polymer material comprising a first polyethylene and a second polyethylene, wherein the first polyethylene is a very low-density polyethylene and the second polyethylene is a linear low-density polyethylene,
    wherein the first polyethylene and the second polyethylene are the sole polymers in the polymer material,
    wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, wherein the flexural modulus is measured in accordance with ASTM D790-17,
    wherein the memory of the flexible hose having an initial outer diameter c/7, determined in accordance with a test wherein a load of 700 N is applied to the flexible hose between two plates of 80x80 mm for 10 seconds at a temperature of 20° C., and wherein the resistance against deformation (the memory) is calculated from d2/d1*100%, wherein d2 is the outer diameter of the flexible hose 1 minute after removing the load, is between 92% and 99.5%.

2. The flexible hose according to claim 1, wherein the profile has a substantially uniform or has a non-uniform wall thickness d of between 0,1 mm and 2,5 mm.

3. The flexible hose according to claim 1, wherein the melt index of the polymer material, as determined in accordance with ASTM D1238-13, is between 0,25 g/10 min and 20 g/10 min.

4. The flexible hose according to claim 1, wherein the flexural modulus of the first polyethylene is between 5 MPa and 200 MPa, and the flexural modulus of the second polyethylene is between 100 MPa and 500 MPa, wherein the flexural modulus is measured in accordance with ASTM D790-17.

5. The flexible hose according to claim 1, wherein the weight of said flexible hose is less than 220 g/m, and wherein the inner diameter of the flexible hose is between 25 mm and 50 mm.

6. The flexible hose according to claim 1, wherein the weight of said flexible hose is between 160 g/m and 120 g/m and the inner diameter of said flexible hose is 32 mm or wherein the weight of said flexible hose is between 210 g/m and 160 g/m and the inner diameter of said flexible hose is 38 mm.

7. The flexible hose according to claim 1, wherein the flex life of said flexible hose is at least 40.000 cycles, according to the standardized repeated bending test (IEC 60312-1, Edition 1.0 (2010), N° 6.9 (2.5 kg)).

8. The flexible hose according to claim 1, wherein the flexible hose resists vacuum of 400 millibar at the inside of the flexible hose without forming a kink while bended.

9. The flexible hose according to claim 1, which is a hose for a vacuum cleaner or a hose for a pool or an industrial hose.

10. The flexible hose according to claim 1, wherein the profile has a substantially uniform or has a non-uniform wall thickness d of between 0.2 mm and 1.0 mm.

11. The flexible hose according to claim 1, wherein the melt index of the polymer material, as determined in accordance with ASTM D1238-13, is between 1.5 g/10 min and 10 g/10 min.

12. The flexible hose according to claim 1, wherein the flexural modulus of the first polyethylene is between 5 MPa and 140 MPa, and the flexural modulus of the second polyethylene is between 130 MPa and 350 MPa, wherein the flexural modulus is measured in accordance with ASTM D790-17.

13. The flexible hose according to claim 1, wherein the weight of said flexible hose is between 200 g/m and 120 g/m.

14. The flexible hose according to claim 1, wherein the inner diameter of the flexible hose is between 30 mm and 42 mm.

15. The flexible hose according to claim 1, wherein the weight ratio between said first polyethylene and said second polyethylene is between 1:10 and 10:1 in the polymer material.

16. The flexible hose according to claim 1, wherein the weight ratio between said first polyethylene and said second polyethylene is between 1:3 and 3:1 in the polymer material.

17. A flexible hose comprising a profile which is spirally wound with consecutive windings of the profile secured to each other by means of a weld,
wherein the profile comprises a polymer material comprising a first polyethylene and a second polyethylene,
wherein the first polyethylene is a very low-density polyethylene and the second polyethylene is a linear low-density polyethylene,
wherein the first polyethylene and the second polyethylene are the sole polymers in the polymer material,
wherein the flexural modulus of said first polyethylene is between 5 MPa, and 500 MPa and wherein the flexural modulus of said second polyethylene is between 5 MPa and 500 MPa, such that the flexural modulus of the polymer material is between 30 MPa and 300 MPa, wherein the flexural modulus is measured in accordance with ASTM D790-17;
wherein the flexible hose has an inner diameter of between 31 mm and 39 mm, wherein the weight of the flexible hose is between 80 g/m and 220 g/m, wherein the memory of the flexible hose having an initial outer diameter d1, determined in accordance with a test wherein a load of 700 N is applied to the flexible hose between two plates of 80x80 mm for 10 seconds at a temperature of 20° C., and wherein the resistance against deformation (the memory) is calculated from d2/d1*100%, wherein d2 is the outer diameter of the flexible hose 1 minute after removing the load, is between about 90% and 98%, wherein the hose resists vacuum of 400 millibar at the inside of the hose without forming a kink while bended, wherein the flex life of the hose is at least 40.000 cycles, according to the standardized repeated bending test (IEC 60312-1, Edition 1.0 (2010), N° 6.9 (2.5 kg)), and wherein the melt index of said polymer material, as measured in accordance with ASTM D1238-13, is between 0,3 g/10 min and 2 g/10 min.

18. A flexible hose comprising a profile which is spirally wound with consecutive windings of the profile secured to each other by means of a weld,
wherein the profile comprises a polymer material comprising a first polyethylene and a second polyethylene,
wherein the first polyethylene is a very low-density polyethylene and the second polyethylene is a linear low-density polyethylene,
wherein the first polyethylene and the second polyethylene are the sole polymers in the polymer material,
wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, wherein the flexural modulus is measured in accordance with ASTM D790-17, wherein the flexural modulus of the polymer material, as measured in accordance with ASTM D790-17, is between 100 MPa and 250 MPa, wherein the flexible hose has an inner diameter of between 31 and 33 mm and a weight of between 80 g/m and 160 g/m, wherein the memory of the flexible hose having an initial outer diameter d1, determined in accordance with a test wherein a load of 700 N is applied to the flexible hose between two plates of 80x80 mm for 10 seconds at a temperature of 20° C., and wherein the resistance against deformation (the memory) is calculated from d2/d1*100%, wherein d2 is the outer diameter of the flexible hose 1 minute after removing the load, is between about 90% and 98%, wherein the hose resists vacuum of 400 millibar at the inside of the hose without forming a kink while bended, wherein the flex life of the hose is at least 40.000 cycles, according to the standardized repeated bending test (IEC 60312-1, Edition 1.0 (2010), N° 6.9 (2.5 kg)), and wherein the melt index of said polymer material, as measured in accordance with ASTM D1238-13, is between 0,3 g/10 min and 2 g/10 min.

19. A flexible hose comprising a profile which is spirally wound with consecutive windings of the profile secured to each other by means of a weld,
wherein the profile comprises a polymer material comprising, a first polyethylene and a second polyethylene,
wherein the first polyethylene is a very low-density polyethylene and the second polyethylene is a linear low-density polyethylene,
wherein the first polyethylene and the second polyethylene are the sole polymers in the polymer material,
wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, wherein the flexural modulus is measured in accordance with ASTM D790-17, wherein the flexural modulus of the polymer material, as measured in accordance with ASTM D790-17, is between 100 MPa and 250 MPa, wherein the flexible hose has an inner diameter of between 33 and 35 mm and a weight of between 130 g/m and 210 g/m, wherein the memory of the flexible hose having an initial outer diameter d1, determined in accordance with a test wherein a load of 700 N is applied to the flexible hose between two plates of 80x80 mm for 10 seconds at a temperature of 20° C., and wherein the resistance against deformation (the memory) is calculated from d2/d1*100%, wherein d2 is the outer diameter of the flexible hose 1 minute after removing the load, is between about 90% and 98%, the hose resists vacuum of 400 millibar at the inside of the hose without forming a kink while bended, wherein the flex life of the hose is at least 40.000 cycles, according to the standardized repeated bending test (IEC 60312-1, Edition 1.0 (2010), N° 6.9 (2.5 kg)), and wherein the melt index of said polymer material, as measured in accordance with ASTM D1238-13, is between 0,3 g/10 min and 2 g/10 min.

20. A flexible hose comprising a profile which is spirally wound with consecutive windings of the profile secured to each other by means of a weld,
  wherein the profile comprises a polymer material comprising a first polyethylene and a second polyethylene, wherein the first polyethylene is a very low-density polyethylene and the second polyethylene is a linear low-density-polyethylene,
  wherein the first polyethylene and the second polyethylene are the sole polymers in the polymer material,
wherein the flexural modulus of said first polyethylene is between 5 MPa and 500 MPa and wherein the flexural modulus of said second polyethylene is between 5 MPa and 500 MPa, such that the flexural modulus of the polymer material is between 30 MPa and 300 MPa, wherein the flexural modulus is measured in accordance with ASTM D790-17, wherein the flexural modulus of the polymer material, as measured in accordance with ASTM D790-17, is between 100 MPa and 250 MPa, wherein the flexible hose has an inner diameter of between 35 and 37 mm and a weight of between 150 g/m and 220 g/m, wherein the memory of the flexible hose having an initial outer diameter d1, determined in accordance with a test wherein a load of 700 N is applied to the flexible hose between two plates of 80x80 mm for 10 seconds at a temperature of 20° C., and wherein the resistance against deformation (the memory) is calculated from d2/d1*100%, wherein d2 is the outer diameter of the flexible hose 1 minute after removing the load, is between about 90% and 98%, the hose resists vacuum of 400 millibar at the inside of the hose without forming a kink while bended, wherein the flex life of the hose is at least 40.000 cycles, according to the standardized repeated bending test (IEC 60312-1, Edition 1.0 (2010), N° 6.9 (2.5 kg)), and wherein the melt index of said polymer material, as measured in accordance with ASTM D1238-13, is between 0,3 g/10 min and 2 g/10 min.

* * * * *